United States Patent
Tamaki et al.

(10) Patent No.: US 10,031,365 B2
(45) Date of Patent: Jul. 24, 2018

(54) LIQUID CRYSTAL DISPLAY DEVICE

(71) Applicant: Japan Display Inc., Minato-ku (JP)

(72) Inventors: Masaya Tamaki, Minato-ku (JP); Hayato Kurasawa, Minato-ku (JP); Yasushi Kawata, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 19 days.

(21) Appl. No.: 14/689,282

(22) Filed: Apr. 17, 2015

(65) Prior Publication Data

US 2015/0301399 A1    Oct. 22, 2015

(30) Foreign Application Priority Data

Apr. 18, 2014  (JP) .................................. 2014-086867

(51) Int. Cl.
  *G02F 1/1335* (2006.01)
  *G02F 1/1343* (2006.01)
  *G02F 1/13* (2006.01)

(52) U.S. Cl.
  CPC ...... *G02F 1/133504* (2013.01); *G02F 1/1323* (2013.01); *G02F 1/133512* (2013.01); *G02F 2001/134318* (2013.01)

(58) Field of Classification Search
  CPC ... G02F 1/133512; G02F 2001/134318; G02F 1/1323
  See application file for complete search history.

(56) References Cited

U.S. PATENT DOCUMENTS

| 7,773,174 B2* | 8/2010 | Shimodaira ....... G02F 1/133504 349/112 |
| 2004/0008300 A1* | 1/2004 | Maeda .............. G02F 1/133555 349/114 |
| 2009/0015743 A1* | 1/2009 | Ohtani .............. G02F 1/136209 349/39 |
| 2009/0122240 A1* | 5/2009 | Lim .................. G02F 1/133512 349/106 |
| 2010/0238390 A1* | 9/2010 | Wang .................. G02F 1/13439 349/139 |

(Continued)

FOREIGN PATENT DOCUMENTS

| JP | 2004-302294 | 10/2004 |
| JP | 2009229485 A | * 10/2009 |
| JP | 2014-053000 | 3/2014 |

*Primary Examiner* — Jessica M Merlin
(74) *Attorney, Agent, or Firm* — Oblon, McClelland, Maier & Neustadt, L.L.P.

(57) ABSTRACT

According to one embodiment, a liquid crystal display device includes a first substrate unit including pixel electrodes arranged in a matrix configuration, a second substrate unit including counter electrodes, and a liquid crystal layer. The pixel electrodes include a first and a second pixel electrode arranged to be adjacent along one of the row direction or the column direction. An inter-pixel region is provided between the first and the second pixel electrodes. The counter electrodes include a first and a second opposing portion arranged to be adjacent along the other of the row direction or the column direction. An inter-counter electrode region is provided between the first and the second opposing portions. The inter-counter electrode region overlaps the inter-pixel region. A light-shielding layer is provided in the second substrate unit, and covers the inter-counter electrode region and the inter-pixel region.

9 Claims, 14 Drawing Sheets

(56) References Cited

U.S. PATENT DOCUMENTS

2012/0236239 A1\* 9/2012 Morita .............. G02F 1/134309
  349/123
2013/0229603 A1\* 9/2013 Tamaki ................ G02B 5/0236
  349/113
2014/0043288 A1 2/2014 Kurasawa et al.

\* cited by examiner

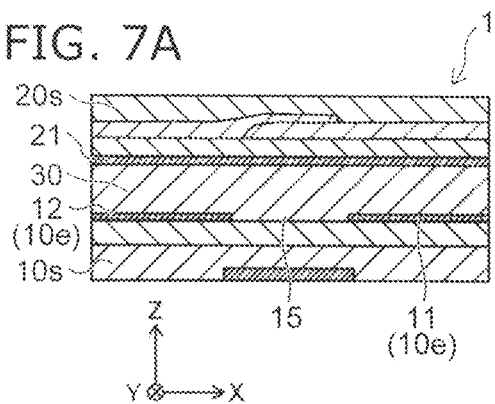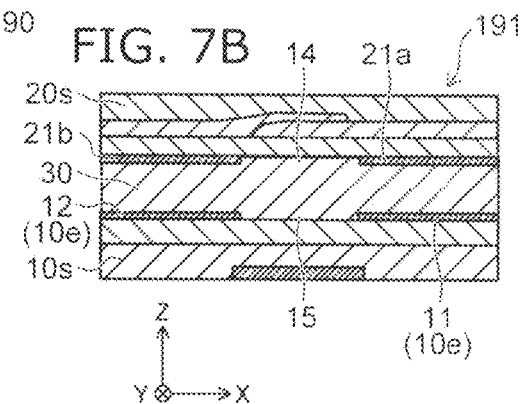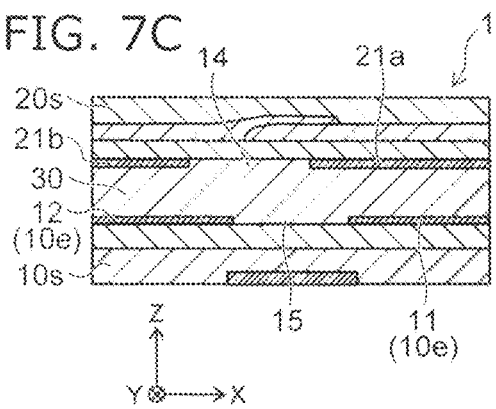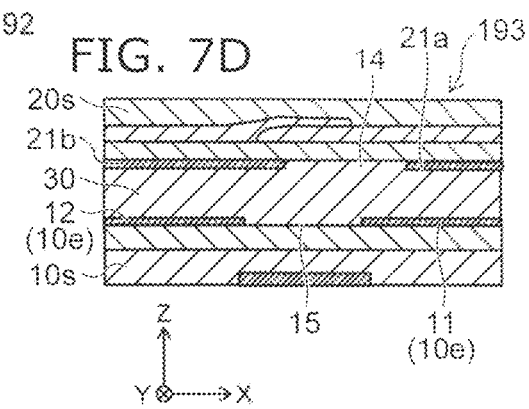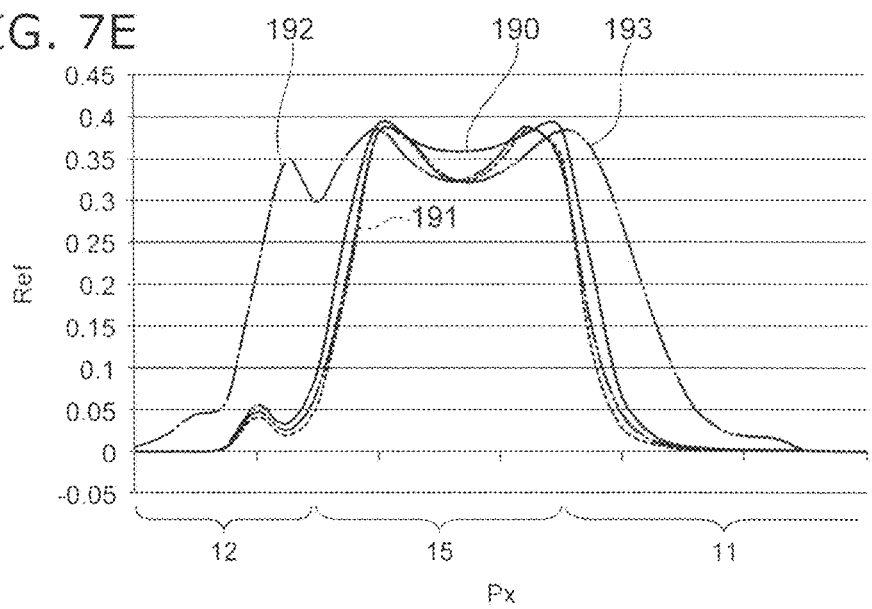

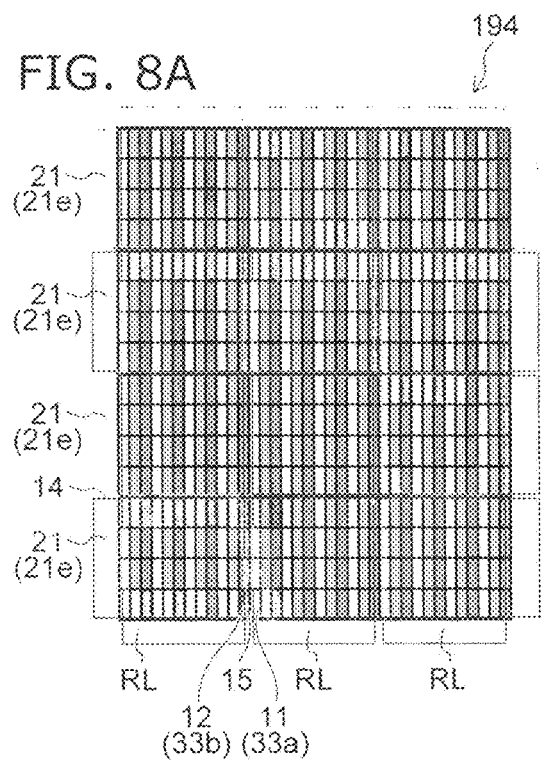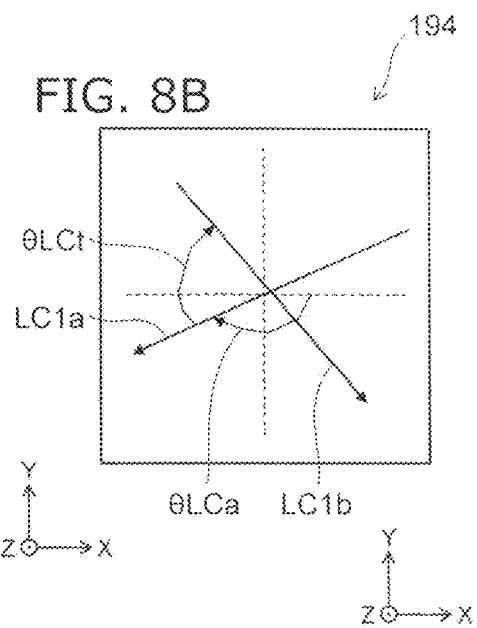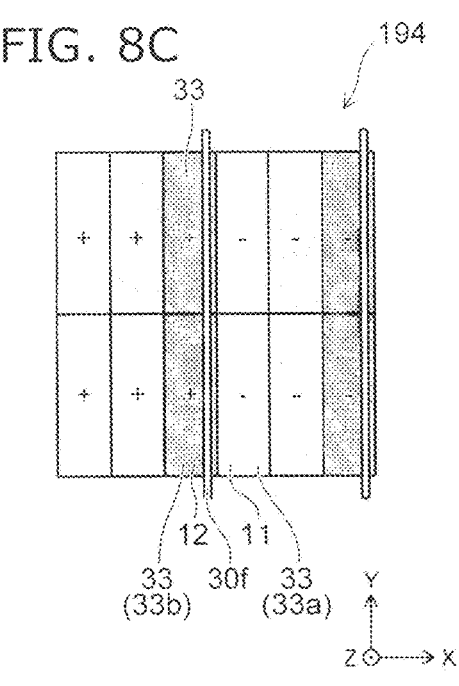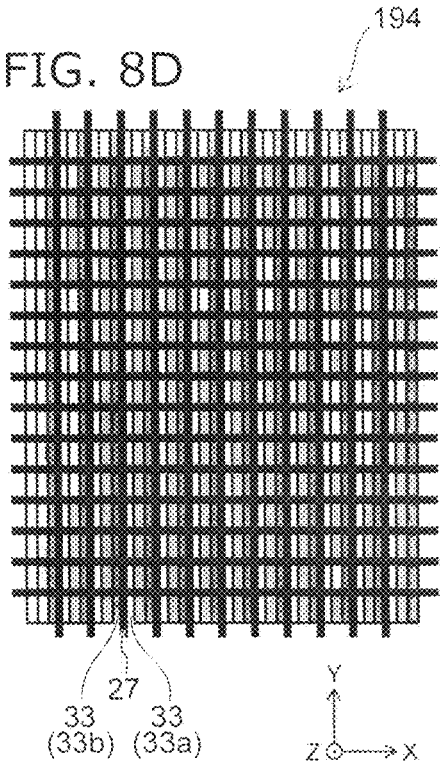

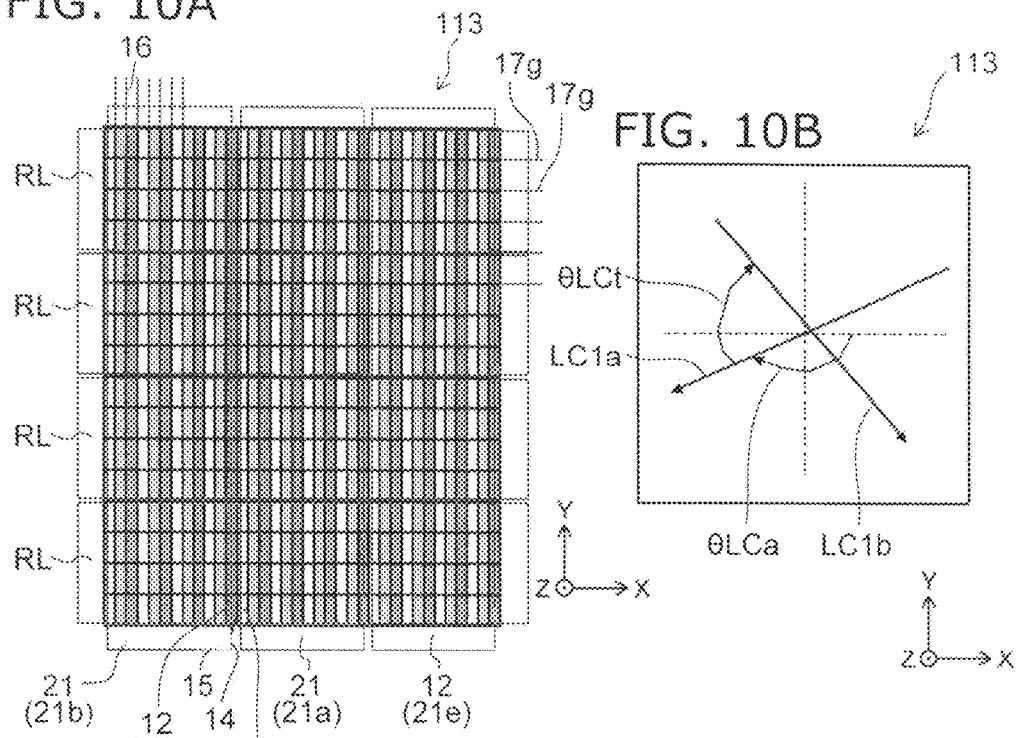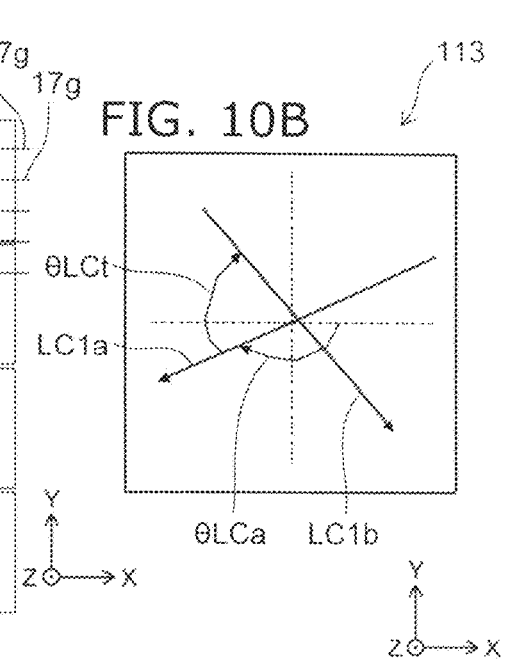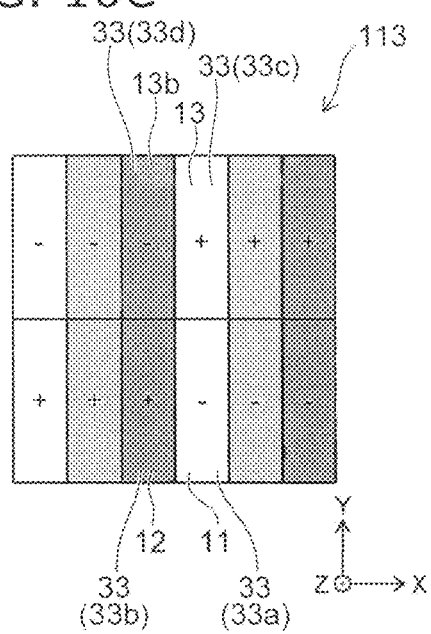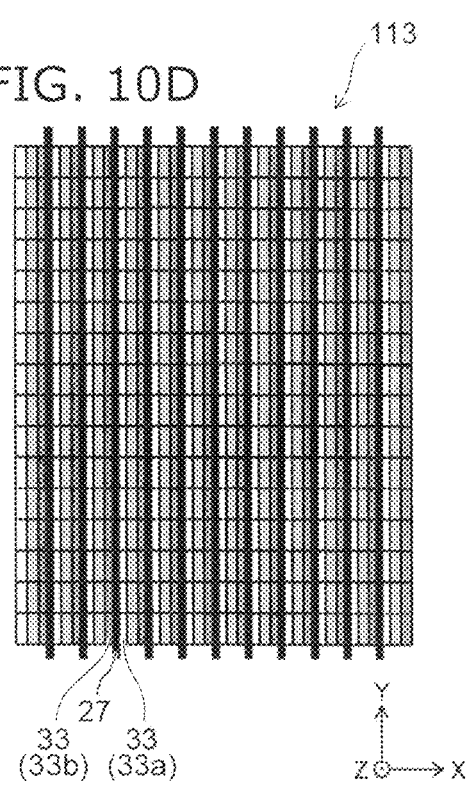

LIQUID CRYSTAL DISPLAY DEVICE

CROSS-REFERENCE TO RELATED APPLICATIONS

This application is based upon and claims the benefit of priority from Japanese Patent Application No. 2014-086867, filed on Apr. 18, 2014; the entire contents of which are incorporated herein by reference.

FIELD

Embodiments described herein relate generally to a liquid crystal display device.

BACKGROUND

A display device that uses a liquid crystal has been developed. A light-shielding part may be provided in the display device. The brightness of the display decreases when the light-shielding part is provided. It is desirable to suppress the decrease of the brightness.

BRIEF DESCRIPTION OF THE DRAWINGS

FIG. 7A to FIG. 7E are schematic views showing liquid crystal display devices;

FIG. 8A to FIG. 8D are schematic views showing a liquid crystal display device;

FIG. 10A to FIG. 10D are schematic views showing another liquid crystal display device according to the first embodiment;

DETAILED DESCRIPTION

Figure 1:
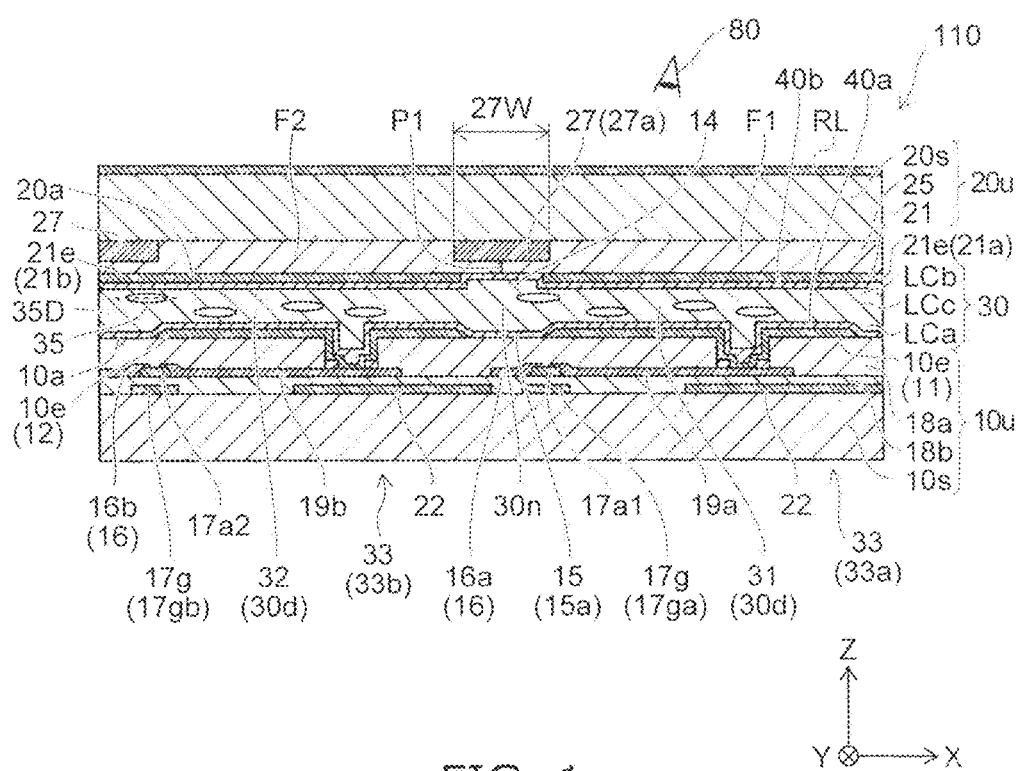
FIG. 1 is a schematic cross-sectional view showing a liquid crystal display device according to a first embodiment.

According to one embodiment, a liquid crystal display device includes a first substrate unit, a second substrate unit, and a liquid crystal layer. The second substrate unit is provided to oppose the first substrate unit. The liquid crystal layer is provided between the pair of substrate units. The first substrate unit includes a first major surface, a plurality of pixel electrodes, and an alignment film. The pixel electrodes are arranged in a matrix configuration in the first major surface. A row direction of the matrix is an X-axis direction. A column direction of the matrix is a Y-axis direction intersecting the X-axis direction. The alignment film covers the pixel electrodes and opposing the liquid crystal layer. The pixel electrodes include a first pixel electrode and a second pixel electrode arranged to be adjacent along one of the row direction or the column direction. The first pixel electrode and the second pixel electrode are driven by mutually-different polarities. An inter-pixel region is provided to extend in the column direction between the first pixel electrode and the second pixel electrode. The second substrate unit includes a second major surface, a plurality of counter electrodes and an alignment film. The second major surface opposes the first major surface of the first substrate unit. The counter electrodes are disposed in the second major surface. The counter electrodes are light-transmissive. The alignment film covers the counter electrodes and opposes the liquid crystal layer. The counter electrodes include a first opposing portion and a second opposing portion. The first opposing portion and the second opposing portion oppose the pixel electrodes of the first substrate unit. The first opposing portion and the second opposing portion are provided to extend in one of the row direction or the column direction. The first opposing portion and the second opposing portion are arranged to be adjacent to each other along the other of the row direction or the column direction. An inter-counter electrode region is provided between the first opposing portion and the second opposing portion. The inter-counter electrode region and the inter-pixel region of the first substrate unit overlap when projected onto the first major surface. A light-shielding layer is provided along the other of the row direction or the column direction in the second substrate unit. The light-shielding layer extends in the column direction and covers the inter-counter electrode region and the inter-pixel region.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

FIG. 1 is a schematic cross-sectional view showing a liquid crystal display device according to a first embodiment.

Figure 2A:
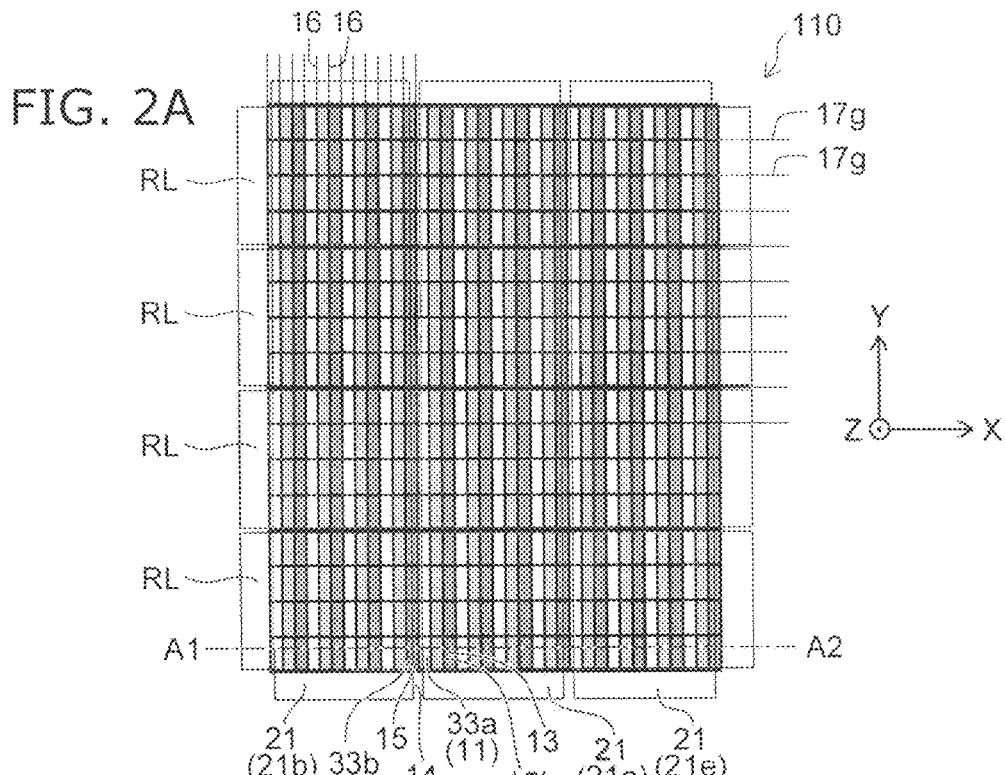
FIG. 2A and FIG. 2B are perspective plan views showing the liquid crystal display device according to the first embodiment.
Figure 2B:
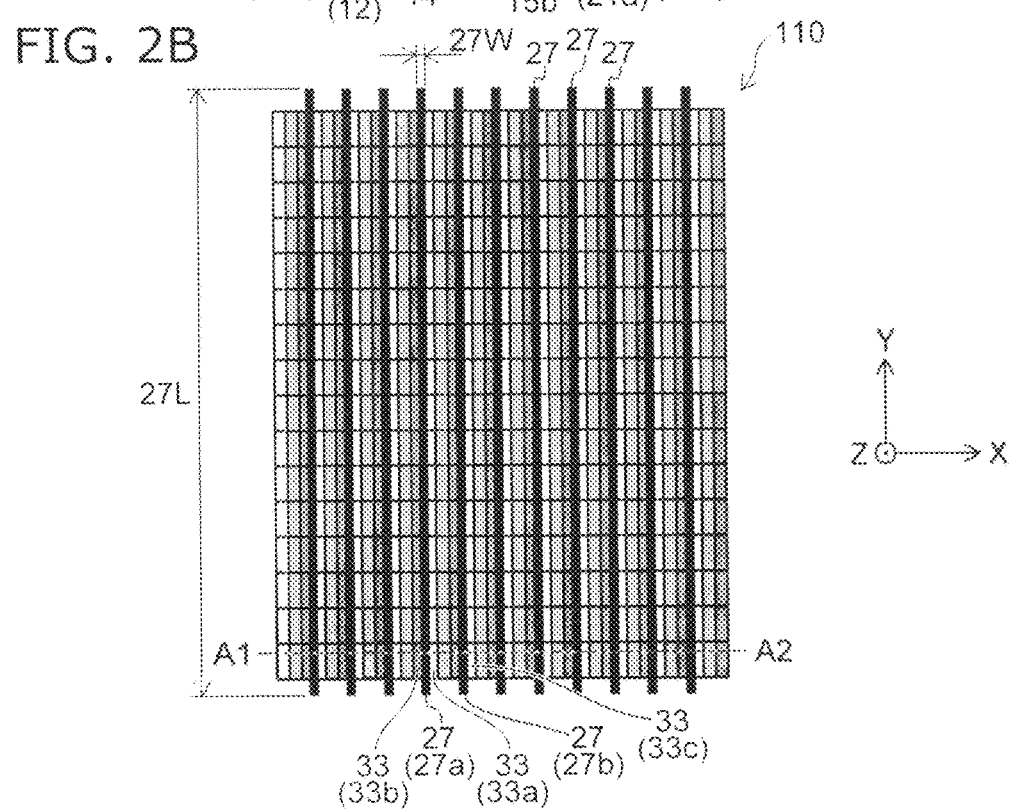

FIG. 2A and FIG. 2B are perspective plan views showing the liquid crystal display device according to the first embodiment.

FIG. 1 shows a portion of the cross section along line A1-A2 of FIG. 2A. A portion of the liquid crystal display device 110 is not shown in FIG. 1, FIG. 2A, and FIG. 2B for easier viewing.

As shown in FIG. 1, FIG. 2A, and FIG. 2B, the liquid crystal display device 110 according to the embodiment includes a first substrate unit 10u, a second substrate unit 20u, a liquid crystal layer 30, and a light-shielding part 27 (a first light-shielding part 27a, i.e., a light-shielding layer).

A direction from the first substrate unit 10u toward the second substrate unit 20u is taken as a Z-axis direction. One direction perpendicular to the Z-axis direction is taken as an X-axis direction. A direction perpendicular to the Z-axis direction and the X-axis direction is taken as a Y-axis direction.

The liquid crystal layer 30 is provided between the first substrate unit 10u and the second substrate unit 20u.

The first substrate unit 10u includes a first substrate 10s that is light-transmissive and is formed in a flat plate configuration; and one of a pair of surfaces of the first substrate 10s opposes the second substrate unit 20u. The first substrate unit 10u has a first major surface 10a. The first major surface 10a intersects the Z-axis direction. Because the normal direction of the first major surface 10a matches the Z-axis, the first major surface 10a is parallel to the X-Y plane. The first substrate unit 10u further includes multiple pixel electrodes 10e (a first pixel electrode 11, a second pixel electrode 12, etc.). The multiple pixel electrodes 10e are arranged in a matrix configuration inside the first major surface 10a, where the X-axis direction is the row direction and the Y-axis direction is the column direction. The pixel electrodes 10e are provided between the liquid crystal layer 30 and the first substrate 10s. The multiple pixel electrodes 10e are light-reflective.

The second pixel electrode 12 is arranged to be adjacent to the first pixel electrode 11 in one of the X-axis direction or the Y-axis direction. In the example, the second pixel electrode 12 is arranged with the first pixel electrode 11 in the X-axis direction.

Although the X-axis and the Y-axis are orthogonal in the embodiment, a configuration in which the X-axis and the Y-axis intersect at a prescribed angle also may be employed.

The first substrate unit 10u includes multiple inter-pixel regions 15. The multiple inter-pixel regions 15 extend in the Y-axis direction respectively between the pixel electrodes 10e. In the example, the inter-pixel region 15 (a first inter-pixel region 15a) that extends in the Y-axis direction is provided between the first pixel electrode 11 and the second pixel electrode 12.

The second substrate unit 20u includes a second substrate 20s that is light-transmissive and is formed in a flat plate configuration; and one of a pair of surfaces of the second substrate 20s opposes the first substrate unit 10u. The second substrate unit 20u has a second major surface 20a. Counter electrodes 21 (common electrodes) are provided in the second major surface 20a. The counter electrodes 21 are light-transmissive.

The counter electrodes 21 include multiple opposing portions 21e (a first opposing portion 21a, a second opposing portion 21b, etc.). The multiple opposing portions 21e are disposed inside the second major surface 20a. The multiple opposing portions 21e oppose at least a portion of the multiple pixel electrodes 10e. In the example, the second opposing portion 21b is arranged with the first opposing portion 21a in the X-axis direction. In the embodiment, the multiple opposing portions 21e are separated from each other in the X-axis direction. The multiple opposing portions 21e are formed in band configurations extending in the Y-axis direction; and the width of the multiple opposing portions 21e is equal to the total width of the multiple pixel electrodes 10e and the regions between pixel electrodes 10e.

The second substrate unit 20u includes an inter-counter electrode region 14. The inter-counter electrode region 14 is the region between the mutually-adjacent opposing portions 21e and has a slit configuration. The inter-counter electrode region 14 extends in the Y-axis direction along the side edges of the opposing portions 21e. The inter-counter electrode region 14 and some of the inter-pixel regions 15 overlap when projected onto the first major surface 10a of the first substrate unit 10u. In the overlapping state in the embodiment, the first opposing portion 21a opposes the first pixel electrode 11; and the second opposing portion 21b opposes the second pixel electrode 12. In other words, the first inter-pixel region 15a and the inter-counter electrode region 14 that is provided between the first opposing portion 21a and the second opposing portion 21b overlap when projected onto the first major surface 10a.

In the example, the light-shielding part 27 and at least a portion of the inter-counter electrode region 14 overlap when projected onto the X-Y plane. The light-shielding part 27 and at least a portion of the inter-pixel region 15 overlap when projected onto the X-Y plane.

The light-shielding part 27 extends in the Y-axis direction as shown in FIG. 2B. A black matrix having a stripe configuration (vertical stripes) in the Y-axis direction is formed of the multiple light-shielding parts 27 separated from each other in the X-axis direction. In other words, the light-shielding parts 27 are provided along the Y-axis direction to cover the first inter-pixel region 15a and the inter-counter electrode region 14 between the first opposing portion 21a and the second opposing portion 21b.

As shown in FIG. 2A and FIG. 2B, the liquid crystal display device 110 further includes a second light-shielding part 27b. The first substrate unit 10u further includes a second inter-pixel region 15b and a third pixel electrode 13 provided in the first major surface 10a.

A length (a width) 27W along the X-axis direction of the light-shielding part 27 is shorter than a length 27L along the Y-axis direction of the light-shielding part 27. The length 27W along the X-axis direction of the light-shielding part 27 is not less than 1 times and not more than 2 times a length (a width) 14W along the X-axis direction of the inter-counter electrode region 14.

The liquid crystal layer 30 is provided between the first major surface 10a and the second major surface 20a. A portion of the liquid crystal layer 30 is disposed between the counter electrodes 21 and the multiple pixel electrodes 10e. Another portion of the liquid crystal layer 30 is disposed between the second substrate unit 20u and the inter-pixel region 15 of the first substrate unit 10u.

The liquid crystal layer 30 includes pixel units 30d (a first pixel unit 31, a second pixel unit 32, etc.). The first pixel unit 31 is disposed between the first pixel electrode 11 and the second substrate unit 20u. The second pixel unit 32 is disposed between the second pixel electrode 12 and the second substrate unit 20u. The liquid crystal layer 30 further includes a non-pixel portion 30n. The non-pixel portion 30n is disposed between the inter-pixel region 15 and the second substrate unit 20u.

The liquid crystal layer 30 includes a nematic liquid crystal. Liquid crystal molecules 35 that are included in the liquid crystal layer 30 have a positive dielectric anisotropy and a director direction 35D matching the long-axis direction of the liquid crystal molecules. The alignment of the long-axis direction 35D of the liquid crystal molecules 35 changes according to the intensity of the electric field generated between the counter electrodes 21 and the pixel electrodes 10e. In other words, the alignment of the liquid crystal layer 30 on the pixel electrodes 10e changes according to the voltage applied to the pixel electrodes 10e. The effective birefringence (the retardation) of the liquid crystal layer 30 changes according to the change of the alignment of the liquid crystal layer 30. The optical rotatory properties (the optical activity) may change according to the change of the liquid crystal alignment.

The liquid crystal display device 110 of the embodiment is a reflection-type display device and is a touch panel-type display device.

The light that is incident on the liquid crystal display device 110 from the front side passes through the second substrate unit 20u and the liquid crystal layer 30 and is incident on the pixel electrodes 10e. The light that is incident on the pixel electrodes 10e is reflected by the pixel electrodes 10e. The light that is reflected passes through the liquid crystal layer 30 and the second substrate unit 20u and is emitted to the outside from the front side.

In the state in which a voltage is not applied, the pixel unit 30d is in a bright state. In the state in which a prescribed voltage is applied, the pixel unit 30d is in a dark state. In the case where the liquid crystal layer 30 has a threshold, the prescribed voltage is higher (has a larger effective value) than the threshold. A normally bright (normally white) configuration is applied to the pixel unit 30d. The example may be normally black.

The second substrate unit 20u includes multiple sense lines RL on the second substrate.

The multiple sense lines RL are separated from each other in the Y-axis direction. Each of the multiple sense lines RL extends in the X-axis direction.

The capacitance that is formed between each of the multiple opposing portions 21e and each of the multiple sense lines RL is sensed. Thereby, the touch input for the liquid crystal display device 110 is sensed. In the sense operation, a finger of a viewer (a user) of the liquid crystal display device 110, an input member (an input pen), etc., contacts or is proximal to the liquid crystal display device 110. The electrical capacitance created by the sense lines RL and the opposing portions 21e changes due to the contact or proximity recited above. The interval of the touch input and the touch output is sensed by sensing the change of the electrical capacitance. Electrostatic-capacitance type sensing is performed. The liquid crystal display device 110 is a display device including an input function. In the example, the counter electrodes 21 are used as electrodes for the display and as electrodes for the sensing of the touch input.

The first substrate unit 10u further includes a switching element 17a, multiple signal lines 16 (a first signal line 16a, a second signal line 16b, etc.), multiple gate lines 17g (a third gate line 17ga, a fourth gate line 17gb, etc.), interconnects 22, an insulating layer 18a, and an insulating layer 18b.

Figure 3:
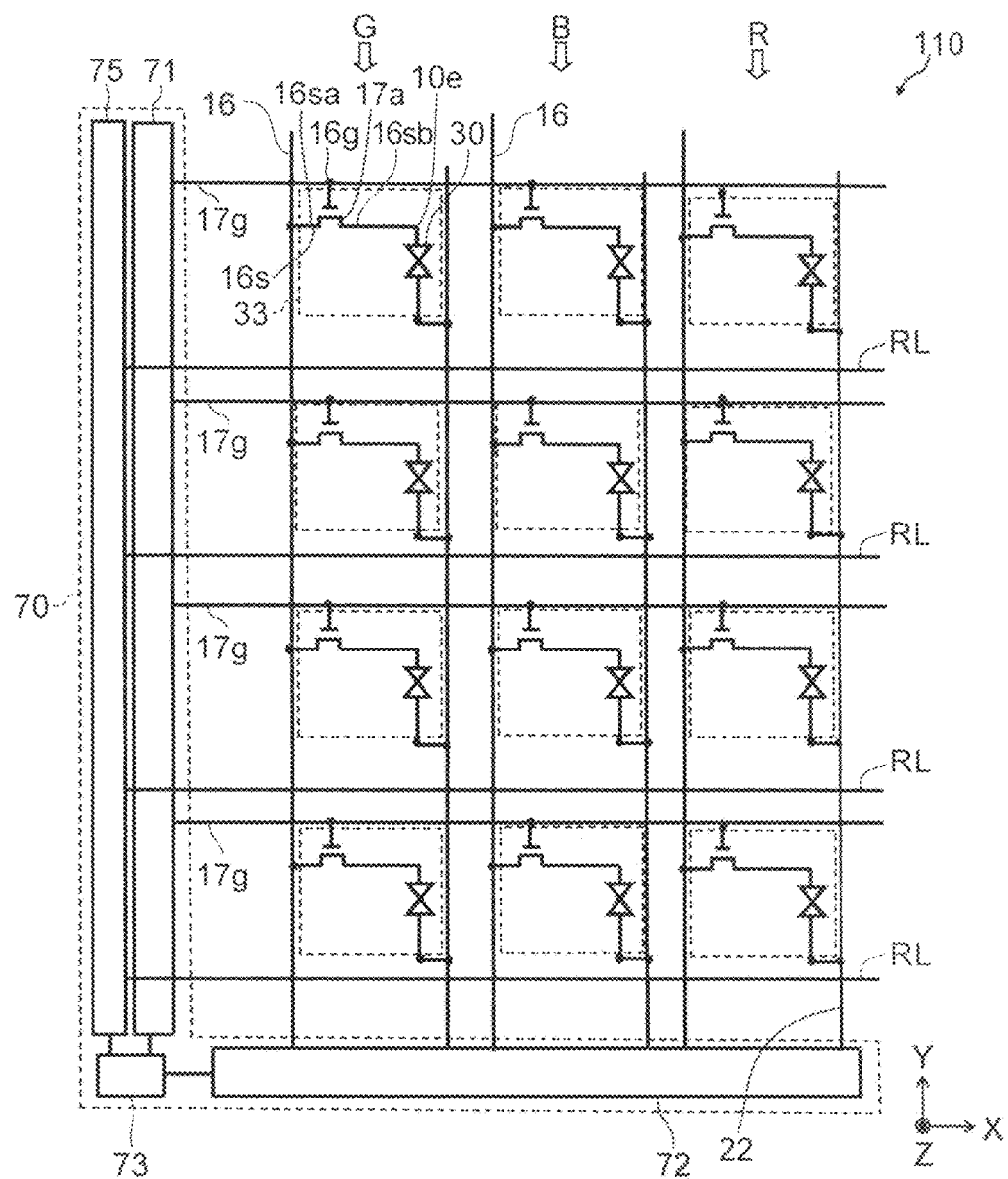
FIG. 3 is a schematic view showing the liquid crystal display device according to the first embodiment.

FIG. 3 is a schematic view showing the liquid crystal display device according to the first embodiment.

As shown in FIG. 3, the multiple switching elements 17a, the multiple pixel electrodes 10e, and the liquid crystal layer 30 are provided in the display device 110. Each of the multiple switching elements 17a is electrically connected to one of the multiple gate lines 17g or one of the multiple signal lines 16.

The switching element 17a includes a gate 16g and a semiconductor layer 16s. The semiconductor layer 16s includes a first portion 16sa and a second portion 16sb. The gate 16g is electrically connected to one of the multiple gate lines 17g. The first portion 16sa of the semiconductor layer 16s is electrically connected to one of the multiple signal lines 16.

The multiple pixel electrodes 10e are electrically connected respectively to the multiple switching elements 17a. One pixel electrode 10e is electrically connected to the second portion 16sb of the semiconductor layer 16s of the switching element 17a.

The liquid crystal layer 30 performs an optical operation based on an electrical signal applied to the multiple pixel electrodes 10e. The optical operation includes at least one of light emission or a change of an optical characteristic. The liquid crystal layer 30 is provided between the multiple pixel electrodes 10e and the multiple sense lines RL.

Multiple pixels 33 are provided in the display device 110. At least one switching element 17a and at least one pixel electrode 10e are provided for each of the multiple pixels 33.

In other words, the multiple switching elements 17a are provided respectively for the multiple pixels 33. The multiple pixel electrodes 10e are provided respectively for the multiple pixels 33.

A controller 70 (a drive device 210) is provided in the display device 110 as shown in FIG. 3.

The controller 70 includes a first drive circuit 71, a second drive circuit 72, and a control circuit 73. The first drive circuit 71 is electrically connected to the multiple gate lines 17g. The second drive circuit 72 is electrically connected to the multiple signal lines 16 and the multiple interconnects 22. The control circuit 73 is electrically connected to the first drive circuit 71 and the second drive circuit 72. The control circuit 73 performs appropriate signal processing of the electrical signal (including an image signal) that is acquired. The electrical signal on which the signal processing is performed is supplied to the first drive circuit 71 and the second drive circuit 72.

The optical operation of the liquid crystal layer 30 at the multiple pixels 33 is controlled by the interconnects 22, the signal lines 16, the switching elements 17a, and the pixel electrodes 10e. Thereby, the display is performed. In the display operation, the interconnects 22 are utilized as counter electrodes of the pixel electrodes 10e. In other words, the potential of each of the multiple pixel electrodes 10e is controlled by an electrical signal being supplied to the pixel electrode 10e via the switching element 17a. The alignment of the liquid crystal changes due to the electric field generated between the pixel electrodes 10e and the interconnects 22; and the display is performed.

A sense circuit 75 may be further provided in the controller 70. The sense circuit 75 is electrically connected to the sense lines RL. In the sense operation, the capacitance created between each of the multiple interconnects 22 and each of the multiple sense lines RL is sensed by the second drive circuit 72 and the sense circuit 75.

The touch input for the display device 110 is sensed by the multiple sense lines RL and the multiple interconnects 22. In the sense operation, a finger of the viewer (the user) of the display device 110, an input member (e.g., an input pen or the like), etc., contacts or is proximal to the display device 110. The electrical capacitance that is created by the sense lines RL and the interconnects 22 changes due to the contact or proximity recited above. The touch input is sensed by sensing the change of the electrical capacitance.

In the embodiment, the first substrate 10s and the second substrate 20s include glass substrates or resin substrates.

The counter electrodes 21 include a light-transmissive conductive material. The counter electrodes 21 include an oxide including at least one element selected from the group consisting of In, Sn, Zn, and Ti. The counter electrodes 21 include ITO (Indium Tin Oxide), etc. The counter electrodes 21 may include a thin metal layer that is light-transmissive.

The counter electrodes 21 are light-transmissive. For the members (the first substrate 10s, the second substrate 20s, the counter electrodes 21, etc.) that are light-transmissive, the transmittance is higher than the reflectance. For the members that are light-transmissive, the transmittance is higher than the absorptance.

The pixel electrodes 10e include aluminum, etc. The pixel electrodes 10e are light-reflective. For the members (the pixel electrodes 10e, etc.) that are light-reflective, the reflectance is higher than the transmittance. For the members that are light-reflective, the reflectance is higher than the absorptance.

It is favorable for the pixel electrodes 10e (the first pixel electrode 11, the second pixel electrode 12, etc.) to be specular. The polarization characteristics of the light incident on the pixel electrodes 10e and reflected by the pixel electrodes 10e is substantially not changed by the reflection. In the case where the pixel electrodes 10e have high diffuse reflectivity, there are cases where the polarization characteristics of the reflected light are different from the polarization characteristics of the incident light. The contrast ratio of the display may decrease in the case where the polarity degrades due to the reflection. In the case where the pixel electrodes 10e are specular, it is easy to obtain a high contrast ratio. The surface of the pixel electrodes 10e is relatively flat. Thereby, specular reflectivity is obtained easily.

The pixels include subpixels RGB in the embodiment. The configuration that includes all of the RGB subpixels is used as one pixel. The second substrate unit 20u includes a color filter layer 25. The color filter layer 25 is provided between the counter electrodes 21 and the second substrate 20s. A first color filter F1 is provided between the first opposing portion 21a and the second substrate 20s. A second color filter F2 is provided between the second opposing portion 21b and the second substrate 20s. The transmittances of the color filters are high for light of prescribed colors. The first color filter F1 transmits light of a first color. The second color filter F2 transmits light of a second color. The intensity of the light of the prescribed color can be controlled by the light passing through the color filter.

The color filter layer 25 includes a first boundary portion P1 between the first color filter F1 and the second color filter F2. The first boundary portion P1 and a portion of the first light-shielding part 27a overlap when projected onto the X-Y plane.

The light-shielding part 27 includes chrome, a compound including chrome, etc. A black resin may be used as the light-shielding part 27. The light-shielding part 27 may include a stacked film in which color filters corresponding to light of different colors are stacked. The light-shielding part 27 includes a stacked film of the first color filter F1 and the second color filter F2.

The first substrate unit 10u and the second substrate unit 20u further include a first alignment film 40a and a second alignment film 40b, respectively. The first alignment film 40a covers the multiple pixel electrodes 10e and opposes the liquid crystal layer 30. The second alignment film 40b covers the counter electrodes 21 and opposes the liquid crystal layer 30. Alignment films 40 align the liquid crystal of the liquid crystal layer 30. The alignment films 40 include organic films such as polyimide, etc.

The liquid crystal layer 30 includes a nematic liquid crystal. The liquid crystal layer 30 may include a chiral agent. A thickness tLC of the liquid crystal layer 30 is the distance along the Z-axis direction between the alignment film 40 covering the pixel electrodes 10e and the alignment film 40 covering the counter electrodes 21.

The liquid crystal layer 30 includes a first portion LCa on the pixel electrode side, a second portion LCb on the counter electrode side, and a third portion LCc between the first portion LCa and the second portion LCb. Although the configuration of the liquid crystal layer is described as being divided into three portions in the thickness direction for convenience in the invention, these regions are indistinct. Specifically, the liquid crystal layer is divided into three portions in the thickness direction; the liquid crystal molecules belonging to the first portion LCa are mainly the liquid crystal molecules at a position proximal to the pixel electrodes; the liquid crystal molecules belonging to the second portion LCb are liquid crystal molecules at a position proximal to the counter electrode; and the liquid crystal molecules belonging to the third portion LCc are positioned between the first portion LCa and the second portion LCb. The thicknesses of the three portions may not be uniform; and, for example, the third portion LCc may be larger than the other two portions.

It is also possible to define the first portion LCa as the region where the effect of the aligning force (the anchoring force) of the alignment film 40 on the pixel electrode 10e side is dominant, the second portion LCb as the region where the aligning force of the alignment film 40 on the counter electrode 21 side is dominant, and the third portion LCc as the region where twisting occurs more easily due to the effect of the electric field than due to the aligning forces.

The dielectric anisotropy of the liquid crystal layer 30 may be positive or negative. In the embodiment, the dielectric anisotropy of the liquid crystal layer 30 is positive.

In the state (the initial state) in which the electric field is generated in the liquid crystal layer 30 (between the pixel electrode and the counter electrode), the long-axis direction 35D of the liquid crystal molecules 35 of the liquid crystal layer 30 is substantially aligned in the X-Y plane. The pretilt angle of the liquid crystal molecules 35 (the angle between the long-axis direction 35D and the X-Y plane) is 10 degrees or less, e.g., about 5 degrees. The tilt angle of the liquid crystal molecules 35 becomes large by generating the electric field in the liquid crystal layer 30 by applying the voltage to the pixel electrode. When applying the voltage, the tilt angle of the third portion LCc of the liquid crystal layer 30 is about 90 degrees. In the case where the dielectric anisotropy of the liquid crystal layer 30 is negative, the pretilt angle is not less than 70 degrees and not more than 90 degrees. In the embodiment, the pretilt angle is arbitrary.

The alignment of the long axis of the liquid crystal molecules 35 (the long-axis direction 35D, i.e., the liquid crystal director direction) at the first portion LCa is determined by the alignment direction (the rubbing direction) of the alignment film 40 of the first substrate unit 10u. The alignment of the long axis of the liquid crystal molecules 35 at the second portion LCb is determined by the alignment direction of the alignment film 40 of the second substrate unit 20u.

Figure 4:
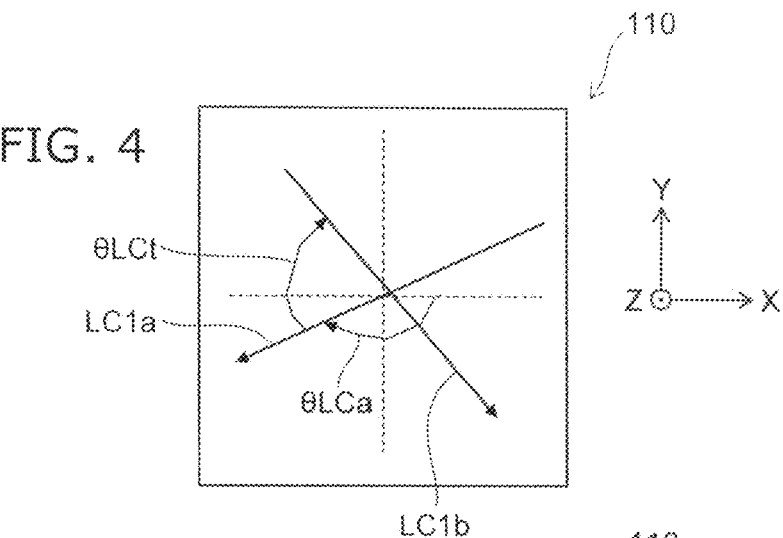
FIG. 4 is a schematic view showing the liquid crystal display device according to the first embodiment.

FIG. 4 is a schematic view showing the liquid crystal display device according to the first embodiment.

FIG. 4 shows the alignment direction of the liquid crystal molecules of the liquid crystal layer 30.

As shown in FIG. 4, the alignment direction (a first alignment direction LC1a) at the first portion LCa of the liquid crystal layer 30 intersects the Y-axis when projected onto the X-Y plane. The angle (a first alignment angle θLCa) between the first alignment direction LC1a and the X-axis direction is not less than 140 degrees and not more than 180 degrees. The X-axis direction component of the first alignment direction LC1a is larger than the Y-axis direction component of the first alignment direction LC1a.

The alignment direction (a second alignment direction LC1b) at the second portion LCb of the liquid crystal layer 30 intersects the first alignment direction LC1a. The angle (a twist angle θLCt) between the first alignment direction LC1a and the second alignment direction LC1b is not less than 60 degrees and not more than 80 degrees. Here, a counterclockwise angle is taken to be positive using the X-axis direction as a reference.

Information relating to the alignment direction of the alignment film 40 is obtained by analyzing the alignment film 40 using polarized light. The information relating to the alignment processing direction of the alignment film 40 is obtained by observing the nonuniformity (rubbing scratches, etc.) of the alignment processing. There are cases where lines based on the nonuniformity of the alignment processing are easy to observe when a voltage including direct current is applied between the counter electrodes 21 and the pixel electrodes 10e. The alignment processing direction (and the long-axis direction 35D can be determined based on the lines.

The alignment direction (the long-axis direction 35D) of the liquid crystal at the first portion LCa is determined by determining the alignment processing direction of the first substrate unit 10u. The alignment direction of the liquid crystal at the first portion LCa is aligned with the alignment processing direction of the first substrate unit 10u. Similarly, the alignment direction (the long-axis direction 35D) of the liquid crystal at the second portion LCb is determined by determining the alignment processing direction of the second substrate unit 20u. In other words, the alignment direction of the liquid crystal at the second portion LCb is aligned with the alignment processing direction of the second substrate unit 20u.

Figure 5:
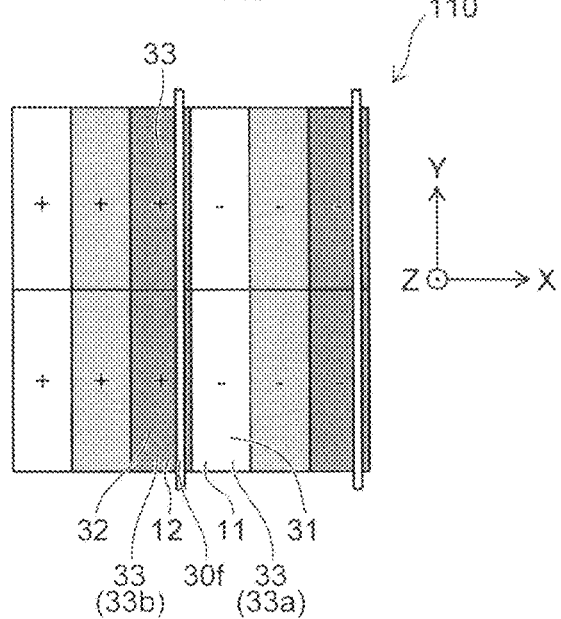
FIG. 5 is a schematic view showing the liquid crystal display device according to the first embodiment.

FIG. 5 is a schematic view showing the liquid crystal display device according to the first embodiment.

FIG. 5 shows the polarities of the voltages applied to each of the pixel electrodes 10e in the display operation of the liquid crystal display device 110.

As shown in FIG. 5, the first pixel electrode 11 is set to a potential having a first polarity using the counter electrode 21 as a reference. In the example, the first polarity is negative. The second pixel electrode 12 is set to a potential having a second polarity using the counter electrode 21 as the reference. The second polarity is different from the first polarity. In the example, the second polarity is positive.

For the pixel 33 that is arranged in the Y-axis direction with a first pixel 33a, the polarity of the voltage applied to the pixel electrode 10e is the same as the first polarity.

For the pixel 33 arranged in the Y-axis direction with a second pixel 33b, the polarity of the voltage applied to the pixel electrode 10e is the same as the second polarity.

The polarity of the voltage applied to each of the pixel electrodes is switched every column (the multiple pixels arranged in the Y-axis direction) of the pixels every frame.

The driving in which the polarity is inverted every adjacent pixel column as described above is called column inversion driving.

Thus, the first pixel electrode 11 and the second pixel electrode 12 are driven by mutually-different polarities. An electric field (a lateral electric field) is generated along a direction parallel to the X-axis direction in the display operation due to the abrupt change of the polarity. The lateral electric field is generated between the first pixel electrode 11 and the second pixel electrode 12 (the non-pixel portion 30n).

Due to the electric field, there are cases where defects of the alignment (disclinations) occur in the liquid crystal molecules 35 positioned on the boundary (the inter-pixel region) between the first pixel electrode 11 and the second pixel electrode 12 and at around the boundary. Similarly, there are cases where the defects of the alignment occur in the liquid crystal molecules 35 included in the end portion (a pixel end portion 30f) of the second pixel unit 32 on the first pixel unit 31 side. As a result, it is considered that the contrast undesirably decreases in the display operation of the liquid crystal display device due to the occurrence of the disclinations.

Thus, the electric field is generated between the pixel electrodes 10e of which the applied voltages have mutually-different polarities. The alignment defects of the liquid crystal occur easily in the region of the liquid crystal layer 30 corresponding to the position where the electric field is generated. In the liquid crystal display device 110 according to the embodiment, the alignment defects of the liquid crystal occur easily in the region of the liquid crystal layer 30 along the Y-axis direction due to the electric field generated between the pixel electrodes 10e.

The disclinations occur easily when the component of the first alignment direction LC1a parallel to the electric field direction (in the example, the X-axis direction) is larger than the component of the first alignment direction LC1a perpendicular to the electric field direction (in the example, the Y-axis direction).

When the electric field is generated between the counter electrodes 21 and the pixel electrodes 10e, the alignment of the long-axis direction of the liquid crystal molecules 35 changes continuously from the pixel electrode 10e side toward the counter electrode 21 side. By setting the first portion LCa and the second portion LCb to be in the alignment states described above, when the electric field is generated between the pixel electrodes 10e and the counter electrodes 21, the long-axis direction of a portion of the liquid crystal molecules 35 included in the third portion LCc is aligned mainly with the alignment of the X-axis direction (the negative side).

At this time, the polarity of the voltage applied to the first pixel electrode 11 is different from the polarity of the voltage applied to the second pixel electrode 12. Therefore, the electric field is generated between the first pixel electrode and the second pixel electrode 12; the liquid crystal molecules 35 of the third portion LCc aligned in the X-axis direction are affected by the electric field; and as a result, alignment disorder (disclinations) occurs on the inter-pixel region 15.

In the example, the alignment disorder occurs along the Y-axis direction because the driving is performed to cause the polarity of the applied potential to invert between the first pixel electrode 11 and the second pixel electrode 12.

In the embodiment, the light-shielding part 27 that extends in the Y-axis direction is provided at a position to overlap the inter-pixel region 15 which is used as the disclination occurrence region of the liquid crystal layer 30 when projected onto the X-Y plane. Thereby, the disorder of the display occurring due to the disclinations is not easily viewed; and the decrease of the contrast can be suppressed.

The signal lines 16 (the first signal line 16a and the second signal line 16b) that are provided in the first substrate unit 10u include metal films.

The semiconductor layer 16s that is included in the switching elements 17a includes, for example, low-temperature polysilicon, amorphous silicon, or an oxide semiconductor. The oxide semiconductor includes an oxide including at least one of indium (In), gallium (Ga), or zinc (Zn).

The insulating layers 18 (the insulating layers 18a and 18b) include, for example, resin materials. For example, at least one of an acrylic resin or a polyimide resin is used as the resin material. The insulating layer 18a may be light-absorbing. Thereby, the transmission of the light by the inter-pixel region 15 is suppressed. On the other hand, high patterning precision of the insulating layer 18 is obtained easily in the case where the light-transmissivity of the insulating layer 18 is high. The insulating layer 18 may include a stacked film of a resin layer and an inorganic layer. For example, at least one of silicon nitride, silicon oxynitride, or silicon oxide is used as the inorganic layer.

Figure 6:
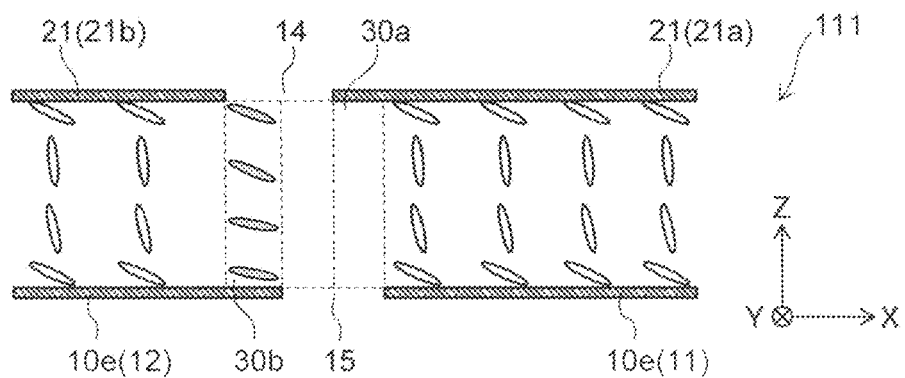
FIG. 6 is a schematic view showing an operation of the liquid crystal display device.

FIG. 6 is a schematic view showing an operation of the liquid crystal display device.

FIG. 6 shows the relationship between the alignment direction of the liquid crystal molecules 35 and the voltage applied between the counter electrodes 21 and the pixel electrodes 10e in the liquid crystal display device 111. A configuration similar to the configuration described in regard to the liquid crystal display device 110 is applicable to the liquid crystal display device 111.

The inter-pixel region 15 and the inter-counter electrode region 14 are disposed to overlap when projected onto the X-Y plane. However, fluctuation occurs in the manufacturing processes of the liquid crystal display device 111. Due to the fluctuation, there are cases where the inter-counter electrode region 14 and at least a portion of the inter-pixel region 15 do not overlap when projected onto the X-Y plane. In such a liquid crystal display device 111, overlap shift occurs between the counter electrodes 21 and the pixel electrodes 10e (between the inter-pixel region 15 and the inter-counter electrode region 14). There are cases where the alignment of the liquid crystal molecules 35 is disorderly due to the overlap shift.

In the example, the liquid crystal layer 30 includes a first region 30a such that the first region 30a and the first opposing portion 21a overlap but the first region 30a and the first pixel electrode 11 do not overlap when projected onto the X-Y plane. The liquid crystal layer 30 includes a second region 30b such that the second region 30b and the second pixel electrode 12 overlap but the second region 30b and the second opposing portion 21b do not overlap when projected onto the X-Y plane.

The desired voltage is not applied to the liquid crystal molecules 35 in the first region 30a or the second region 30b. Thereby, alignment defects occur in the liquid crystal molecules 35 of the first region 30a or the liquid crystal molecules 35 of the second region 30b.

FIG. 7A to FIG. 7E are schematic views showing liquid crystal display devices.

FIG. 7A to FIG. 7D show liquid crystal display devices 190 to 193 of reference examples.

FIG. 7E shows the results of a simulation in which a reflectance Ref (%) is calculated for the liquid crystal display devices 190 to 193.

As shown in FIG. 7A, the inter-counter electrode region 14 is not provided in the liquid crystal display device 190. In other words, slits are not provided in the counter electrode 21.

As shown in FIG. 7B, the inter-counter electrode region 14 and the inter-pixel region 15 overlap in the X-axis direction in the liquid crystal display device 191. In other words, in the liquid crystal display device 191, the overlap shift does not occur between the counter electrode 21 and the pixel electrodes 10e.

In the liquid crystal display device 192 as shown in FIG. 7C, the inter-counter electrode region 14 is disposed further in the −X axis direction (the direction from the first pixel electrode 11 toward the second pixel electrode 12) than is the inter-pixel region 15. The distance between the position of the inter-counter electrode region 14 along the X-axis direction and the position of the inter-pixel region 15 along the X-axis direction is 3 μm.

In the liquid crystal display device 193 as shown in FIG. 7D, the inter-counter electrode region 14 is disposed further in the +X axis direction (the direction from the second pixel electrode 12 toward the first pixel electrode 11) than is the inter-pixel region 15. The distance between the position of the inter-counter electrode region 14 along the X-axis direction and the position of the inter-pixel region 15 along the X-axis direction is 3 μm.

In each of the liquid crystal display devices 190 to 193, the length of the inter-pixel region 15 along the X-axis direction is 4 μm. In each of the liquid crystal display devices 190 to 193, the length of the inter-counter electrode region 14 along the X-axis direction is 4 μm. The light-shielding part 27 is not provided in the liquid crystal display devices 190 to 193.

Otherwise, a configuration similar to the configuration described in regard to the liquid crystal display device 110 is applicable to the liquid crystal display devices 190 to 193.

The vertical axis of FIG. 7E is the reflectance Ref of the liquid crystal display devices. The horizontal axis of FIG. 7E is a position Px along the X-axis direction. A voltage of 3 V is applied between the counter electrode 21 and the pixel electrodes 10e in the calculation of the reflectance Ref.

In the liquid crystal display device 190 and the liquid crystal display device 191 as shown in FIG. 7E, a reflectance Ref at the position Px corresponding to the first pixel electrode 11 and the reflectance Ref at the position Px corresponding to the second pixel electrode 12 are low.

In the liquid crystal display device 192, the reflectance Ref at the position Px corresponding to the second pixel electrode 12 is high due to the overlap shift between the counter electrodes 21 and the pixel electrodes 10e. In the liquid crystal display device 193, the reflectance Ref at the position Px corresponding to the first pixel electrode 11 is high due to the overlap shift between the counter electrodes 21 and the pixel electrodes 10e.

Thus, when the overlap shift occurs, the desired voltage is not applied to the liquid crystal molecules 35; and the disorder of the alignment occurs. Thereby, even when the voltage is applied to the electrodes, a region where the reflectance does not decrease (a region where the black is indistinct) occurs; and there are cases where the contrast undesirably decreases.

In the liquid crystal display device 110 according to the embodiment, the first opposing portion 21a and the second opposing portion 21b extend in the Y-axis direction. In other words, the inter-counter electrode region 14 extends in the Y-axis direction. Therefore, the alignment defects of the liquid crystal occur easily in a region of the liquid crystal layer 30 along the Y-axis direction due to the shift between the positions of the counter electrodes 21 and the positions of the pixel electrodes 10e.

Conversely, in the liquid crystal display device 110, the light-shielding part 27 that extends in the Y-axis direction is provided at a position so that the light-shielding part 27 and the inter-counter electrode region 14 overlap when projected onto the X-Y plane. Thereby, the decrease of the contrast due to the defects of the alignment can be suppressed.

As described above, in the liquid crystal display device 110 according to the embodiment, the first opposing portion 21a and the second opposing portion 21b are separated from each other in the X-axis direction and extend in the Y-axis direction. Also, the polarity of the voltage applied to the first pixel electrode 11 is different from the polarity of the voltage applied to the second pixel electrode 12. The electric field is created along the X-axis direction.

Thereby, the direction of the alignment defects occurring due to the electric field between the multiple pixel electrodes 10e matches the direction of the alignment defects occurring due to the overlap shift between the counter electrodes 21 and the pixel electrodes 10e; and both directions of the alignment defects extend along the Y-direction. Therefore, even in the case where the light-shielding part 27 is provided to suppress the decrease of the contrast occurring due to the alignment defects, it is sufficient for the light-shielding part 27 to extend only along the Y-axis direction; and in the least, it is unnecessary to provide the light-shielding part to extend in the X-axis direction. Therefore, in the liquid crystal display device 110, the surface area of the light-shielding part 27 as an entirety when projected onto the X-Y plane can be reduced. Thereby, the decrease of the reflectance of the liquid crystal display device 110 can be suppressed. The decrease of the brightness of the display can be suppressed.

FIG. 8A to FIG. 8D show the liquid crystal display device 194 of the reference example. A portion of the liquid crystal display device 194 is not shown for easier viewing in these drawings.

FIG. 8A is a perspective plan view of the liquid crystal display device 194. The first substrate unit 10u, the second substrate unit 20u, the liquid crystal layer 30, and the light-shielding part 27 are provided in the liquid crystal display device 194 as well. The counter electrodes 21 include the multiple opposing portions 21e. In the liquid crystal display device 194 as shown in FIG. 8A, the multiple opposing portions 21e are separated from each other in the Y-axis direction. Each of the multiple opposing portions 21e extends in the X-axis direction. The inter-counter electrode region 14 extends in the X-axis direction. The inter-pixel region 15 and the inter-counter electrode region 14 between the first pixel electrode 11 and the second pixel electrode 12 do not overlap when projected onto the X-Y plane. The liquid crystal display device 194 includes the multiple sense lines RL. The multiple sense lines RL are separated from each other in the X-axis direction. Each of the multiple sense lines RL extends in the Y-axis direction. Otherwise, a configuration similar to the configuration described in regard to the liquid crystal display device 110 is applicable to the configuration of the liquid crystal display device 194.

The inter-counter electrode region 14 extends in the X-axis direction in the liquid crystal display device 194. Therefore, the alignment defects of the liquid crystal occur easily in the region of the liquid crystal layer 30 along the X-axis direction due to the shift between the positions of the counter electrodes 21 and the positions of the pixel electrodes 10e.

FIG. 8B shows the alignment direction of the liquid crystal of the liquid crystal layer 30 of the liquid crystal display device 194. As shown in FIG. 8B, the alignment direction of the liquid crystal molecules 35 of the liquid crystal display device 194 is similar to the alignment direction of the liquid crystal molecules 35 of the liquid crystal display device 110.

FIG. 8C shows the voltages applied to each of the pixel electrodes 10e in the display operation of the liquid crystal display device 194. Similarly to the liquid crystal display device 110, column inversion is used in the liquid crystal display device 194 as shown in FIG. 8C. An electric field (a lateral electric field) is generated along a direction parallel to the X-axis direction between the pixel electrodes 10e (between the first pixel electrode 11 and the second pixel electrode 12). Due to the electric field, the defects of the alignment of the liquid crystal occur easily in the region of the liquid crystal layer 30 along the Y-axis direction.

Thus, in the liquid crystal display device 194, the direction of the alignment defects occurring due to the electric field between the multiple pixel electrodes 10e is different from the direction of the alignment defects occurring due to the overlap shift between the counter electrodes 21 and the pixel electrodes 10e.

FIG. 8D is a perspective plan view of the liquid crystal display device 194.

The light-shielding part 27 is provided at a position so that the light-shielding part 27 and the inter-counter electrode region 14 overlap when projected onto the X-Y plane. In other words, the light-shielding part 27 includes a portion extending in the X-axis direction. Thereby, the decrease of the contrast due to the alignment defects of the liquid crystal can be suppressed.

The light-shielding part 27 is provided at a position so that the light-shielding part 27 and the region between the pixel electrodes (the first pixel electrode 11 and the second pixel electrode 12) having mutually-different polarities of the applied voltages overlap when projected onto the X-Y plane. In other words, the light-shielding part 27 includes a portion extending in the Y-axis direction. Thereby, the decrease of the contrast due to the alignment defects occurring due to the electric field between the multiple pixel electrodes 10e can be suppressed.

Thus, in the liquid crystal display device 194 of the reference example, the light-shielding part 27 includes a portion extending in the X-axis direction and a portion extending in the Y-axis direction. The light-shielding part 27 that has a lattice configuration extending in both the vertical direction and the lateral direction is provided in the liquid crystal display device. The surface area of the light-shielding part 27 when projected onto the X-Y plane undesirably increases. Thereby, the reflectance of the liquid crystal display device 194 decreases; and the brightness of the display undesirably decreases markedly.

Conversely, the portion of the light-shielding part 27 of the liquid crystal display device 110 according to the embodiment extending in the X-axis direction can be reduced. The surface area of the light-shielding part 27 as an entirety can be reduced.

Thus, the direction in which each of the multiple opposing portions 21e extends and the direction in which the polarity of the voltage applied to each of the pixel electrodes 10e changes are adjusted. Thereby, the surface area of the light-shielding part 27 can be reduced. The decrease of the brightness of the display due to the light-shielding part 27 can be suppressed.

FIG. 9A to FIG. 9D are schematic views showing another liquid crystal display device according to the first embodiment.

FIG. 9A to FIG. 9D show the liquid crystal display device 112. A portion of the liquid crystal display device 112 is not shown for easier viewing in these drawings.

FIG. 9A to FIG. 9D show the X-Y plane of the liquid crystal display device.

Figure 9A:
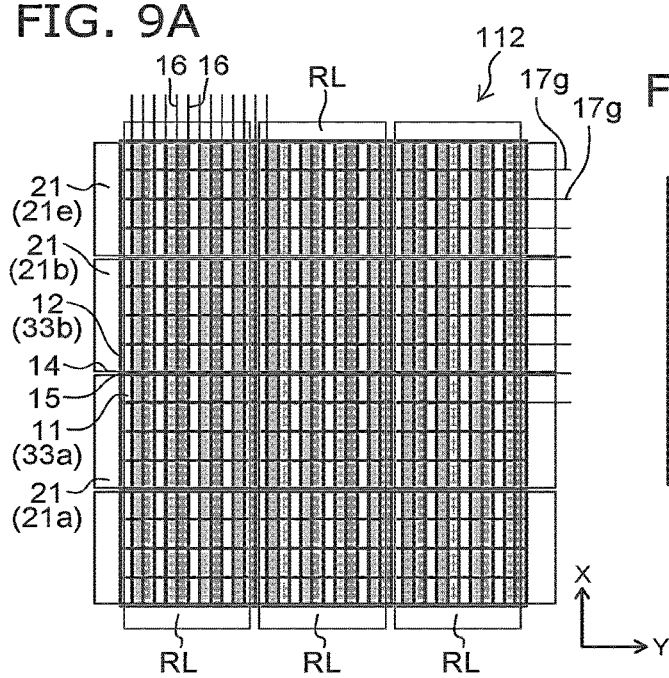
FIG. 9A to FIG. 9D are schematic views showing another liquid crystal display device according to the first embodiment.

FIG. 9A is a perspective plan view of the liquid crystal display device 112. Similarly to the liquid crystal display device 110, the first substrate unit 10u, the second substrate unit 20u, the liquid crystal layer 30, and the light-shielding part 27 are provided in the liquid crystal display device 112 as well.

As shown in FIG. 9A, the second pixel electrode 12 is arranged with the first pixel electrode 11 in the X-axis direction. The X-axis direction is the direction from the second pixel electrode 12 toward the first pixel electrode 11.

The first substrate unit 10u includes the inter-pixel region 15. The inter-pixel region 15 is the region between the multiple pixel electrodes 10e. For example, the inter-pixel region 15 that extends in the Y-axis direction is provided between the first pixel electrode 11 and the second pixel electrode 12.

The counter electrodes 21 include the multiple opposing portions 21e. The multiple opposing portions 21e are separated from each other in the X-axis direction. Each of the opposing portions 21e extends in the Y-axis direction perpendicular to the X-axis direction. The counter electrodes 21 include the first opposing portion 21a and the second opposing portion 21b.

The second substrate unit 20u includes the inter-counter electrode region 14. The inter-counter electrode region 14 is the region between the first opposing portion 21a and the second opposing portion 21b. The inter-counter electrode region 14 extends in the Y-axis direction.

The multiple sense lines RL are separated from each other in the Y-axis direction. Each of the multiple sense lines RL extends in the X-axis direction.

Similarly to the liquid crystal display device 110, the multiple signal lines 16 are separated from each other in the Y-axis direction and extend in the X-axis direction. The multiple gate lines 17g are separated from each other in the X-axis direction and extend in the Y-axis direction.

The inter-counter electrode region 14 extends in the Y-axis direction in the liquid crystal display device 112. Therefore, the alignment defects of the liquid crystal occur easily in the region of the liquid crystal layer 30 along the Y-axis direction due to the shift between the positions of the counter electrodes 21 and the positions of the pixel electrodes 10e.

Figure 9B:
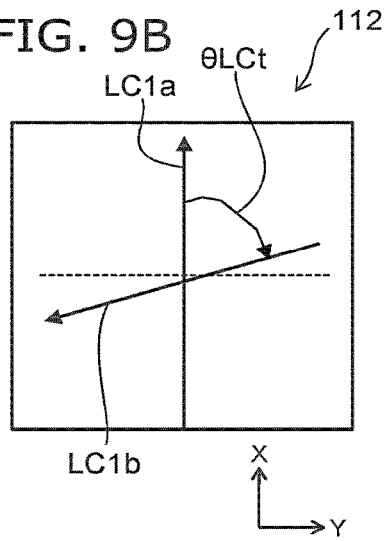

FIG. 9B shows the alignment direction of the liquid crystal of the liquid crystal layer 30 of the liquid crystal display device 112.

In the liquid crystal display device 112 as shown in FIG. 9B, the alignment direction (the first alignment direction LC1a) at the first portion LCa of the liquid crystal layer 30 intersects the Y-axis direction. The angle between the Y-axis direction and the first alignment direction LC1a is not less than 80 degrees and not more than 100 degrees. The component of the first alignment direction LC1a parallel to the X-axis direction is larger than the component of the first alignment direction LC1a parallel to the Y-axis direction.

The alignment direction (the second alignment direction LC1b) at the second portion LCb of the liquid crystal layer 30 intersects the first alignment direction LC1a. The twist angle θLCt is not less than 60 degrees and not more than 80 degrees.

Figure 9C:
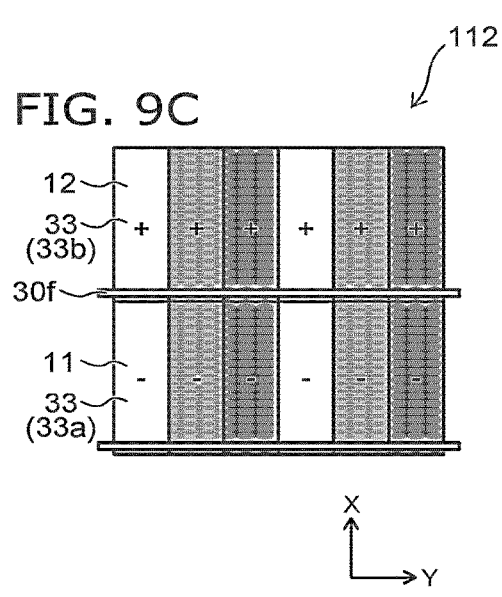

FIG. 9C shows the voltages applied to each of the pixel electrodes 10e in the display operation of the liquid crystal display device 112. As shown in FIG. 9C, the first pixel electrode 11 is set to a potential having the first polarity using the counter electrode 21 as the reference. The first polarity is negative. At this time, the second pixel electrode 12 is set to a potential having the second polarity using the counter electrode 21 as the reference. The second polarity is different from the first polarity. In the example, the second polarity is positive.

In the pixel 33 arranged in the Y-axis direction with the first pixel 33a, the polarity of the voltage applied to the pixel electrode 10e is the same as the first polarity.

In the pixel 33 arranged in the Y-axis direction with the second pixel 33b, the polarity of the voltage applied to the pixel electrode 10e is the same as the second polarity.

In the liquid crystal display device 112, the polarity of the voltage applied to the liquid crystal layer 30 is switched every row of pixels (the multiple pixels arranged in the Y-axis direction).

The driving in which the polarity is switched every row of pixels is called line inversion driving.

An electric field is generated along the X-axis direction between the first pixel electrode 11 and the second pixel electrode 12. The electric field is generated in the region between the pixel electrodes 10e having mutually-different polarities of the applied voltages. The alignment defects of the liquid crystal occur easily in the region of the liquid crystal layer 30 corresponding to the position where the electric field is generated. In the liquid crystal display device 112 according to the embodiment, the alignment defects of the liquid crystal occur easily in the region of the liquid crystal layer 30 along the Y-axis direction.

Thus, in the liquid crystal display device 112, the position (the direction) of the alignment defects occurring due to the electric field between the multiple pixel electrodes 10e match (at least partially overlap when projected onto the X-Y plane) the position (the direction) of the alignment defects occurring due to the overlap shift between the counter electrodes 21 and the pixel electrodes 10e.

Figure 9D:
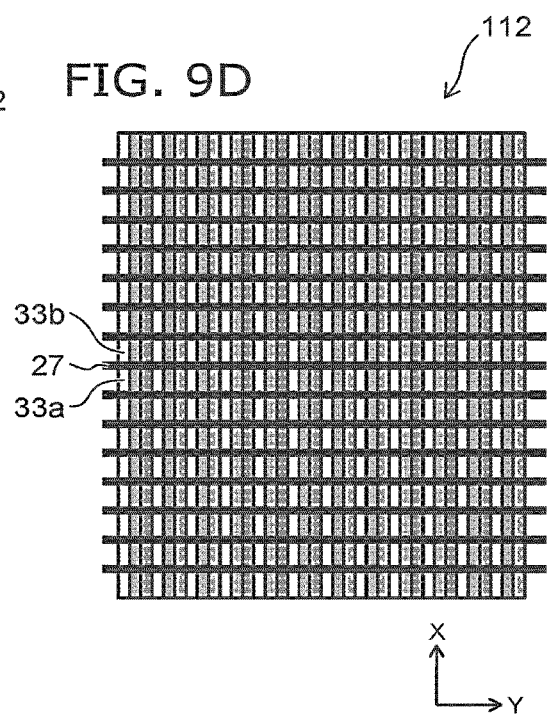

FIG. 9D is a perspective plan view of the liquid crystal display device 112.

The light-shielding parts 27 extend in the Y-axis direction as shown in FIG. 9D. A black matrix having a stripe configuration (lateral stripes) in the lateral direction (the Y-axis direction) is formed of the multiple light-shielding parts 27 separated from each other in the X-axis direction.

The light-shielding part 27 is provided at a position corresponding to the position where the alignment defects of the liquid crystal occur. That is, the light-shielding part 27 is provided at a position to cover the inter-counter electrode region 14 and the inter-pixel region 15. In the liquid crystal display device 112 according to the embodiment, the portion of the light-shielding part 27 extending in the X-axis direction may not be provided. Thereby, the surface area of the light-shielding part 27 can be reduced. The decrease of the brightness of the display due to the light-shielding part 27 can be suppressed.

FIG. 10A to FIG. 10D are schematic views showing another liquid crystal display device according to the first embodiment.

FIG. 10A to FIG. 10D show the liquid crystal display device 113 according to the embodiment. A portion of the liquid crystal display device 113 is not shown for easier viewing in these drawings.

FIG. 10A is a perspective plan view of the liquid crystal display device 113. Similarly to the liquid crystal display device 110, the first substrate unit 10u, the second substrate unit 20u, the liquid crystal layer 30, and the light-shielding part 27 are provided in the liquid crystal display device 113 as well.

In the liquid crystal display device 113 as shown in FIG. 10C, the multiple pixels 33 further include a third pixel 33c and a fourth pixel 33d. The third pixel 33c includes the third pixel electrode 13; and the fourth pixel 33d includes a fourth pixel electrode 13b. The third pixel electrode 13 and the fourth pixel electrode 13b are arranged to be adjacent to each other in the X-axis direction; the third pixel electrode 13 is adjacent to the first pixel electrode 11 in the Y-axis direction; and the fourth pixel electrode 13b is adjacent to the second pixel electrode 12 in the Y-axis direction. Otherwise, a configuration similar to the configuration described in regard to the liquid crystal display device 110 is applicable to the configuration of the liquid crystal display device 113.

The second pixel electrode 12 and the first pixel electrode 11 are arranged to be adjacent to each other in the X-axis direction; the second pixel electrode 12 is adjacent to the fourth pixel electrode 13b in the Y-axis direction; and the first pixel electrode 11 is adjacent to the first pixel electrode in the Y-axis direction. The counter electrodes 21 include the multiple opposing portions 21e. The multiple opposing portions 21e are separated from each other in the X-axis direction and extend in the Y-axis direction. The inter-counter electrode region 14 extends in the Y-axis direction. Therefore, the alignment defects of the liquid crystal occur easily in the region of the liquid crystal layer 30 along the Y-axis direction due to the shift between the positions of the counter electrodes 21 and the positions of the pixel electrodes 10e.

FIG. 10B shows the alignment direction of the liquid crystal of the liquid crystal layer 30 of the liquid crystal display device 113. As shown in FIG. 10S, the alignment direction of the liquid crystal molecules 35 of the liquid crystal display device 113 is similar to the alignment direction of the liquid crystal molecules 35 of the liquid crystal display device 110.

FIG. 10C shows the voltages applied to each of the pixel electrodes 10e in the display operation of the liquid crystal display device 113. As shown in FIG. 10C, the first pixel electrode 11 is set to a potential having the first polarity using the counter electrode 21 as the reference. In the example, the first polarity is negative. The second pixel electrode 12 is set to a potential having the second polarity using the counter electrode 21 as the reference. The second polarity is different from the first polarity. In the example, the second polarity is positive. The third pixel electrode 13 is set to a potential having the second polarity using the counter electrode 21 as the reference. The fourth pixel electrode 13b is set to a potential having the first polarity using the counter electrode 21 as the reference.

The polarities of the applied voltages are different from each other for the pixel electrodes 10e of the multiple pixel electrodes 10e that are adjacent to each other in the Y-axis direction.

For the pixel electrodes 10e of the multiple pixel electrodes 10e arranged in the X-axis direction, the polarity of the applied voltage is switched every three adjacent pixel electrodes 10e. The polarity of the voltage may be switched every three or more adjacent pixel electrodes 10e or every three or fewer adjacent pixel electrodes 10e.

Thus, in the display operation of the liquid crystal display device 113, dot inversion is used in which the polarity of the voltage applied to the pixel electrode 10e is inverted every pixel unit.

An electric field is created along the X-axis direction between the first pixel electrode 11 and the second pixel electrode 12. Also, an electric field is created along the Y-axis direction between the second pixel electrode 12 and the fourth pixel electrode 13b.

In the example as shown in FIG. 10B, the alignment direction (the first alignment direction LC1a) of the liquid crystal molecules 35 at the first portion LCa of the liquid crystal layer 30 is aligned with the X-axis direction. The component of the first alignment direction LC1a parallel to the X-axis direction is larger than the component of the first alignment direction LC1a parallel to the Y-axis direction. Thereby, the alignment defects (the disclinations) of the liquid crystal occur more easily between the first pixel electrode 11 and the second pixel electrode 12 than between the second pixel electrode 12 and the fourth pixel electrode 13b.

Thus, the alignment defects of the liquid crystal occur easily in the region of the liquid crystal layer 30 along the Y-axis direction due to the alignment direction of the liquid crystal molecules 35 and the polarities of the voltages applied to the pixel electrodes 10e.

In the liquid crystal display device 113 as well, the position (the direction) of the alignment defects occurring due to the electric field between the multiple pixel electrodes 10e match (at least partially overlap when projected onto the X-Y plane) the position (the direction) of the alignment defects occurring due to the overlap shift between the counter electrodes 21 and the pixel electrodes 10e.

FIG. 10D is a perspective plan view of the liquid crystal display device 113.

The light-shielding part 27 extends in the Y-axis direction as shown in FIG. 10D. A black matrix having a stripe configuration (vertical stripes) in the vertical direction (the Y-axis direction) is formed of the multiple light-shielding parts 27 separated from each other in the X-axis direction.

The light-shielding part 27 is provided at a position corresponding to the position where the alignment defects of the liquid crystal occur. In the liquid crystal display device 113 according to the embodiment, the portion of the light-shielding part 27 extending in the X-axis direction may not be provided. Thereby, the surface area of the light-shielding part 27 can be reduced. The decrease of the brightness of the display due to the light-shielding part 27 can be suppressed.

Figure 11A:
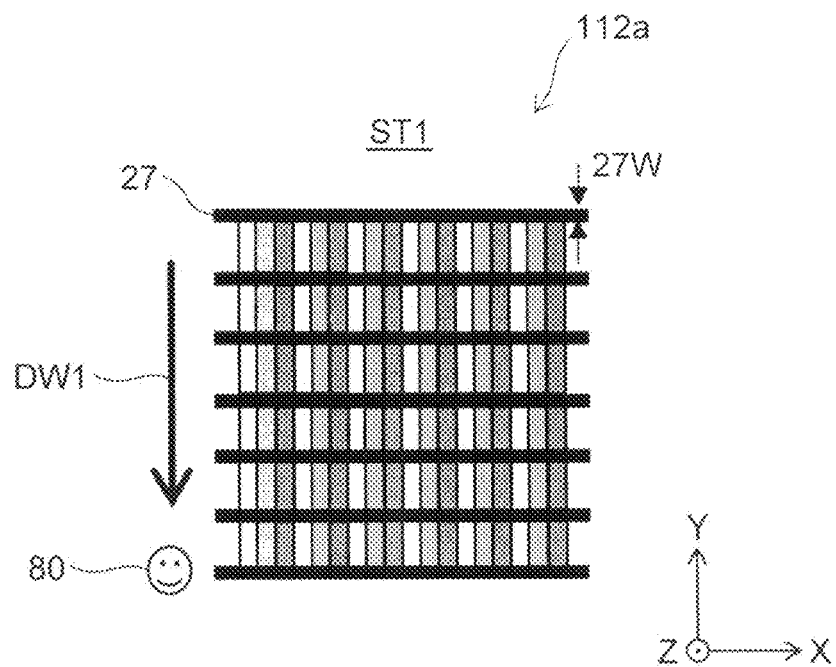
FIG. 11A and FIG. 11B are schematic views showing liquid crystal display devices according to the first embodiment.
Figure 11B:
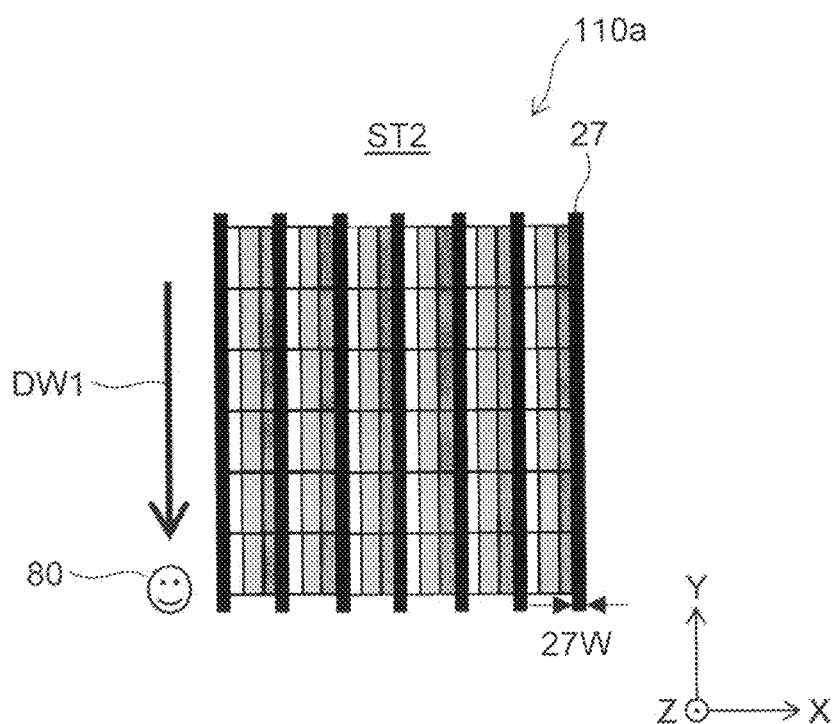

FIG. 11A and FIG. 11B are schematic views showing liquid crystal display devices according to the first embodiment.

FIG. 11A shows the state of use of a liquid crystal display device 112a. The configuration described in regard to the liquid crystal display device 112 is applicable to the liquid crystal display device 112a.

A viewer 80 views the light that is incident on the liquid crystal display device 112 and reflected by the pixel electrodes 10e.

The state of use of the liquid crystal display device 112 is a first state ST1. The first state ST1 is the state in which a major viewing angle direction Dw1 of the viewer 80 (the travel direction of the light viewed by the viewer 80 when projected onto the X-Y plane) intersects the direction in which the light-shielding part 27 extends. The major viewing angle direction is perpendicular to the direction in which the light-shielding part 27 extends. In the first state ST1, the viewer 80 views the liquid crystal display device 112 from a direction (the perpendicular direction) intersecting the direction in which the light-shielding part 27 extends.

FIG. 11B shows the state of use of a liquid crystal display device 110a. The configuration described in regard to the liquid crystal display device 110 is applicable to the liquid crystal display device 110a.

The state of use of the liquid crystal display device 110 is a second state ST2. The second state ST2 is the state in which the major viewing angle direction Dw1 of the viewer 80 is parallel to the direction in which the light-shielding part 27 extends. In the second state ST2, the viewer 80 views the liquid crystal display device 110 from a direction parallel to the direction in which the light-shielding part 27 extends.

The width 27W (the length along the Y-axis direction) of the light-shielding part 27 of the liquid crystal display device 112 is the same as the width 27W (the length along the X-axis direction) of the light-shielding part 27 of the liquid crystal display device 110. In such a case, the liquid crystal display device 110 that is used in the second state ST2 appears brighter to the viewer 80 than the liquid crystal display device 112 that is used in the first state ST1.

In the embodiment, it is desirable for the liquid crystal display device to be used in the second state ST2. In other words, it is desirable to set the direction in which the light-shielding part 27 extends to be parallel to the major viewing angle direction Dw1. In particular, it is desirable for the liquid crystal display device to be used in the second state ST2 in the case where the liquid crystal display device includes an optical layer 65 described below.

Second Embodiment

Figure 12A:
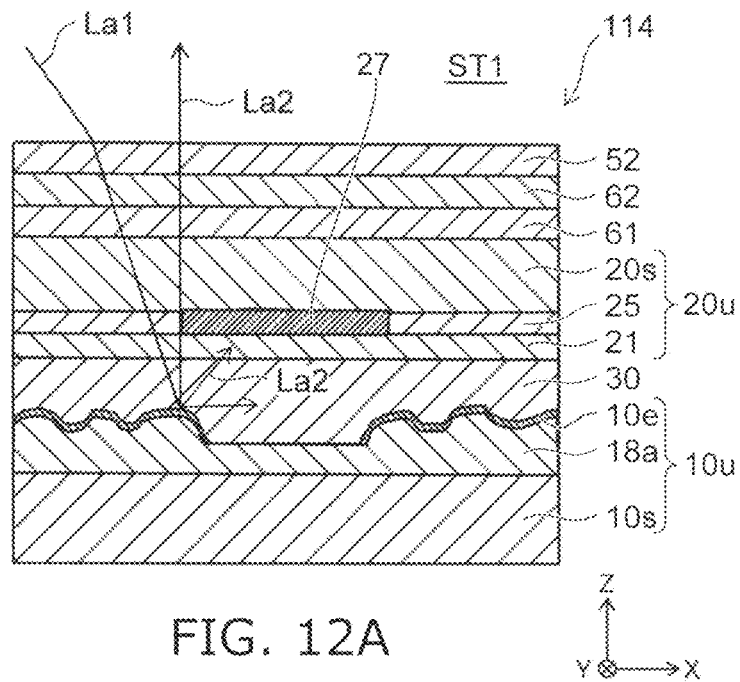
FIG. 12A and FIG. 12B are schematic cross-sectional views showing other liquid crystal display devices according to the second embodiment.
Figure 12B:
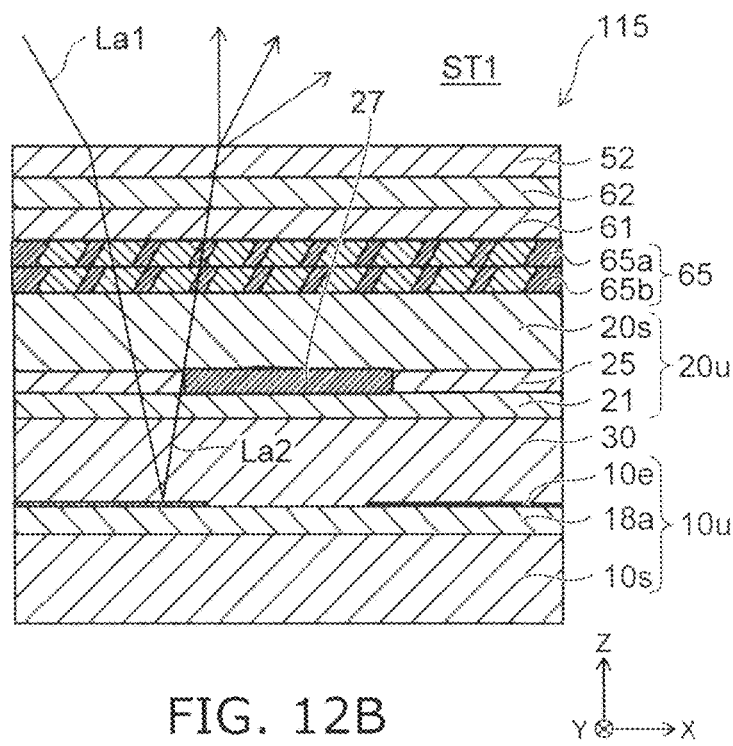

FIG. 12A and FIG. 12B are schematic cross-sectional views showing other liquid crystal display devices according to the second embodiment.

FIG. 12A is a schematic cross-sectional view showing a liquid crystal display device 114. FIG. 12B is a schematic cross-sectional view showing a liquid crystal display device 115. Similarly to the liquid crystal display device 110, the first substrate unit 10u, the second substrate unit 20u, the liquid crystal layer 30, and the light-shielding part 27 are provided in the liquid crystal display devices 114 and 115 as well. In the example, the liquid crystal display devices 114 and 115 are used in the first state ST1.

As shown in FIG. 12A and FIG. 12B, light La1 that travels in a direction perpendicular to the direction in which the light-shielding part 27 extends when projected onto the X-Y plane is incident on the liquid crystal display device 114 or 115. The light La1 that is incident passes through the second substrate unit 20u, the liquid crystal layer 30, etc., and is reflected by the pixel electrodes 10e. A portion of light La2 that is reflected is emitted to the outside and is viewed. On the other hand, another portion of the light La2 that is reflected is shielded by the light-shielding part 27 and is not emitted to the outside. The light that is shielded by the light-shielding part 27 is lost. Thereby, the brightness of the display undesirably decreases.

In the first state ST1, light that is reflected by a region that is wider than the width 27W of the light-shielding part 27 is lost. The loss of the reflected light occurs easily in the first state ST1.

Conversely, in the second state ST2, light that is reflected by a region having the same (about the same) width as the width 27W of the light-shielding part 27 is lost. The loss of the light occurs less easily in the second state ST2 than in the first state ST1.

As shown in FIG. 12A, the liquid crystal display device 114 further includes a polarizing layer 52, a first phase difference layer 61, and a second phase difference layer 62. The second substrate unit 20u is provided between the polarizing layer 52 and the liquid crystal layer 30. The first phase difference layer 61 is provided between the polarizing layer 52 and the second substrate unit 20u. The second phase difference layer 62 is provided between the polarizing layer 52 and the first phase difference layer 61.

A quarter-wave plate is used as the first phase difference layer 61. The retardation of the first phase difference layer 61 is not less than 100 nanometers and not more than 150 nanometers.

A half-wave plate is used as the second phase difference layer 62. The retardation of the second phase difference layer 62 is not less than 240 nanometers and not more than 290 nanometers.

The first phase difference layer 61 and the second phase difference layer 62 include stretched films, etc. For the phase difference layers, the product of the birefringence of the phase difference layer and the thickness of the phase difference layer corresponds to the retardation. The retardation can be determined by analysis using polarized light.

The first phase difference layer 61 substantially changes the linearly polarized light that is incident into circularly polarized light. The second phase difference layer 62 changes the polarization direction of the linearly polarized light that is incident 90 degrees.

By using these phase difference layers, the change of the optical characteristics (the effective birefringence) of the liquid crystal layer 30 is efficiently changed into a change of the brightness of the light. In other words, the brightness is increased; and a high contrast ratio is obtained. The wavelength dependence becomes small.

In the embodiment, these phase difference layers may be provided as necessary and may be omitted. By using the first phase difference layer 61, a high brightness and a high contrast ratio are obtained easily. By using the second phase difference layer 62, the wavelength dependence of the optical characteristics is improved; and the coloring is suppressed.

As shown in FIG. 12A, the pixel electrodes 10e have diffuse reflectivity in the liquid crystal display device 114. An unevenness is provided in the surfaces of the pixel electrodes 10e. A reflective layer that reflects the external light incident via the polarizing layer 52 and the phase difference layer may be provided on the pixel electrodes 10e. Specular reflections are suppressed by the pixel electrodes 10e having diffuse reflectivity. The light La1 that is incident on the polarizing layer 52 from the outside passes through the first phase difference layer 62, the second phase difference layer 61, the second substrate unit 20u, and the liquid crystal layer 30 and is incident on the pixel electrodes 10e. The light that is incident on the pixel electrodes 10e is diffused, is reflected, and is emitted to the outside as the light La2.

As shown in FIG. 12B, the liquid crystal display device 115 includes the optical layer 65. The optical layer 65 is provided between the second substrate unit 20u and the first phase difference layer 61. The optical layer 65 modifies the travel direction of the light that is incident on the optical layer 65. The optical layer 65 diffuses (scatters) the light that is incident on the optical layer 65. The optical layer 65 changes the intensity of the diffuse light (the scattered light)

of the light that is incident on the optical layer 65 according to the direction (the direction in the X-Y plane) of the light that is incident on the optical layer 65.

FIG. 13A to FIG. 13D are schematic views showing a portion of the liquid crystal display device according to the second embodiment.

Figure 13A:
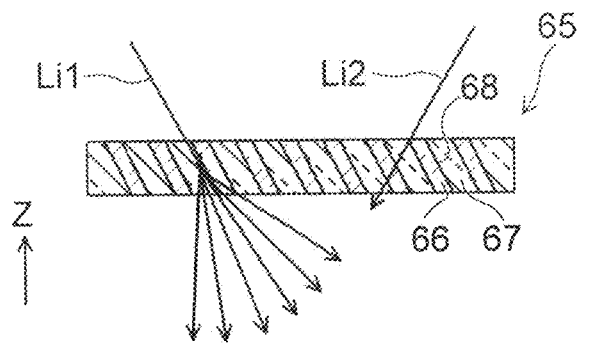
FIG. 13A to FIG. 13D are schematic views showing a portion of the liquid crystal display device according to the second embodiment.
Figure 13B:
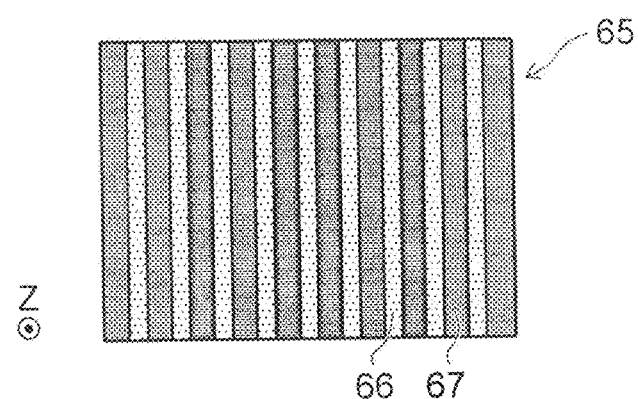
Figure 13C:
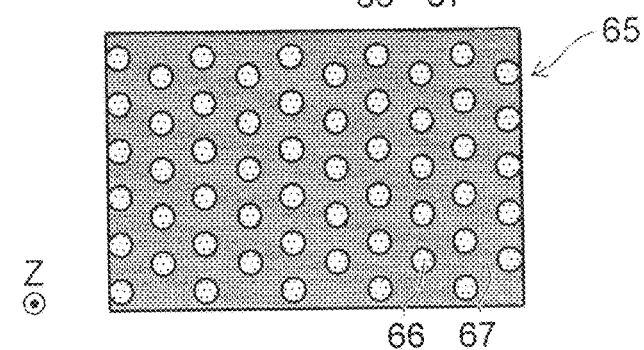
Figure 13D:
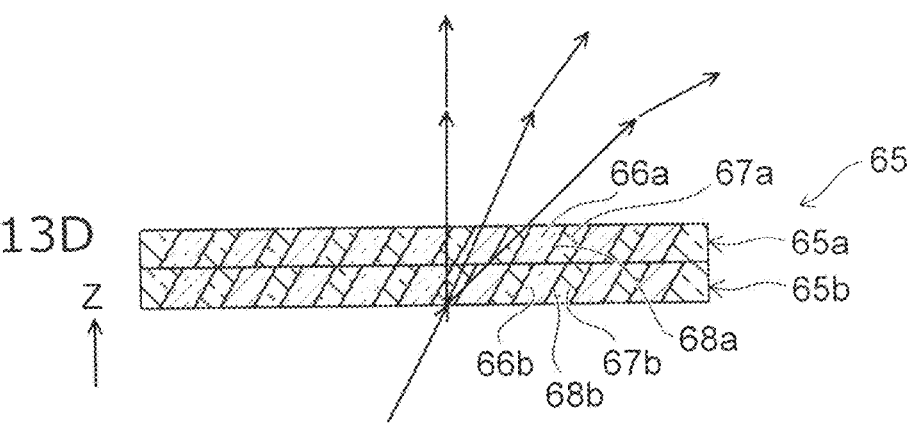

These drawings show the optical layer 65. FIG. 13A is a schematic cross-sectional view showing the optical layer 65. FIG. 13B is a schematic plan view showing the optical layer 65. FIG. 13C is a schematic plan view showing another example of the optical layer 65. FIG. 13D is a schematic cross-sectional view showing another example of the optical layer 65.

As shown in FIG. 13A, the optical layer 65 includes multiple first optical units 66 and a second optical unit 67. The multiple first optical units 66 are disposed in the X-Y plane (in a plane parallel to the first major surface 10*a*). The multiple first optical units 66 are light-transmissive. The second optical unit 67 is provided between any two of the multiple first optical units 66. The second optical unit 67 also is light-transmissive. In the example, multiple second optical units 67 are provided. The multiple first optical units 66 and the multiple second optical units 67 are arranged alternately. A boundary 68 between the second optical unit 67 and at least one of the multiple first optical units 66 is tilted with respect to the X-Y plane. The refractive index of the second optical unit 67 is higher or lower than the refractive index of the first optical unit 66.

The intensity of the scattered light of the optical layer 65 for the light (a first incident light Li1) incident on the optical layer 65 from a first incident direction is different from the intensity of the scattered light of the optical layer 65 for the light (a second incident light Li2) incident on the optical layer 65 from a second incident direction. Here, the direction of the first incident direction in the X-Y plane is different from the direction of the second incident direction in the X-Y plane.

The intensity of the scattered light of the optical layer 65 for the first incident light Li1 is higher than the intensity of the scattered light of the optical layer 65 for the second incident light Li2. The first incident light Li1 is scattered and diffused by the optical layer 65. On the other hand, for the second incident light Li2, the level of scattering (diffusion) of the optical layer 65 is low; and the transmissivity is high. Such scattering characteristics are obtained by the boundary 68 being tilted with respect to the X-Y plane. The optical layer 65 is an anisotropic scattering layer. The optical layer 65 is an anisotropic forward scattering film.

For example, a region having a high refractive index and a region having a low refractive index are provided in the optical layer 65. The optical layer 65 is a transparent film. The level of the scattering of the optical layer 65 is different between the incident directions of the light. The optical layer 65 has a "scattering central axis." The scattering central axis corresponds to the optical axis of the first incident light Li1 shown in FIG. 13A. The scattering central axis corresponds to the incident direction of the light that scatters most.

The optical layer 65 has a direction of the scattering central axis (a scattering center direction). The intensity of the scattered light of the optical layer 65 for the light that is incident on the optical layer 65 from the first incident direction increases as the angle between the scattering center direction and the first incident direction decreases.

As shown in FIG. 13B, the multiple first optical units 66 have band configurations. The first optical units 66 and the second optical units 67 extend along one direction intersecting (orthogonal to) the Z-axis direction. In the example, the optical layer 65 is a louver structure-type.

In another example shown in FIG. 13C, the multiple first optical units 66 have island configurations that are separated from each other. In the example, the optical layer 65 is a columnar structure-type.

In the example shown in FIG. 13D, the optical layer 65 includes multiple layers (a first layer 65*a*, a second layer 65*b*, etc.). These layers are stacked along the Z-axis direction. The first layer 65*a* includes multiple first optical units 66*a* that are light-transmissive and disposed in the X-Y plane, and a second optical unit 67*a* that is light-transmissive and provided between two of the multiple first optical units 66*a*. The refractive index of the second optical unit 67*a* is different from the refractive index of each of the multiple first optical units 66*a*. In such a case as well, a boundary 68*a* that is between the second optical unit 67*a* and at least one of the multiple first optical units 66*a* is tilted with respect to the X-Y plane.

The second layer 65*b* includes multiple third optical units 66*b* that are light-transmissive and disposed in the X-Y plane, and a fourth optical unit 67*b* that is light-transmissive and provided between two of the multiple third optical units 66*b*. The refractive index of the fourth optical unit 67*b* is different from the refractive index of each of the multiple third optical units 66*b*. A boundary 68*b* that is between the fourth optical unit 67*b* and at least one of the multiple third optical units 66*b* is tilted with respect to the X-Y plane. The extension direction of the boundary 68*a* is aligned with the extension direction of the boundary 68*b*. The angle between the plane including the boundary 68*b* and the plane including the boundary 68*a* may be 30 degrees or less. The scattering area is enlarged by providing multiple layers in the optical layer 65. By providing multiple layers in the optical layer 65, the coloration (the occurrence of rainbow colors), etc., can be suppressed. The number of layers provided in the optical layer 65 may be three or more.

Figure 14A:
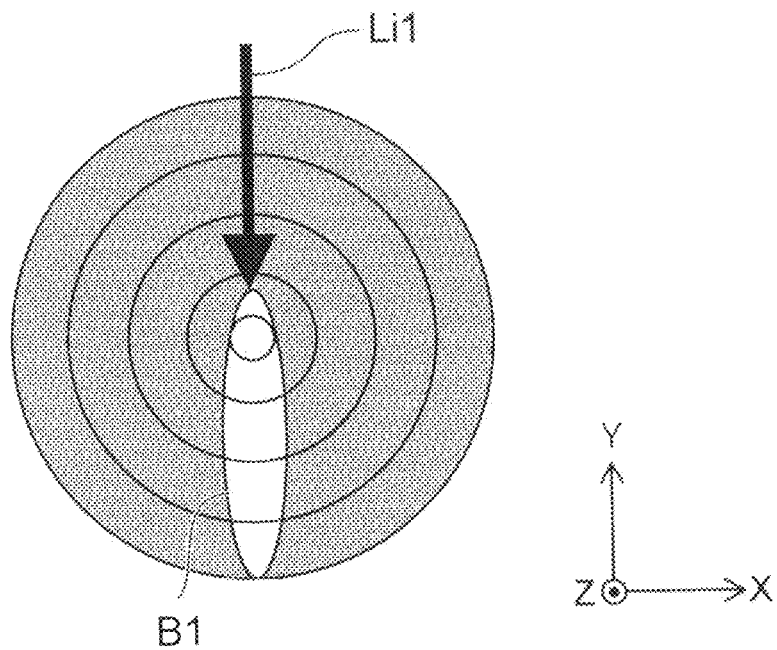
FIG. 14A and FIG. 14B are schematic plan views showing characteristics of the liquid crystal display device according to the second embodiment.
Figure 14B:
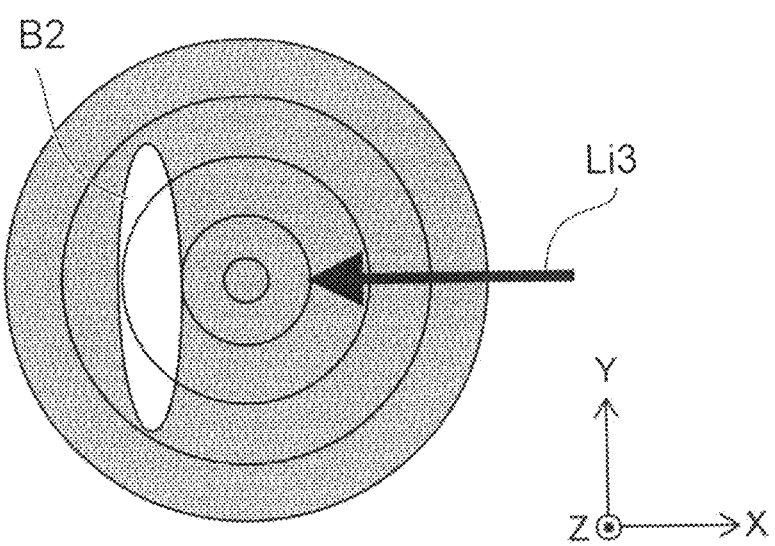

FIG. 14A and FIG. 14B are schematic plan views showing characteristics of the liquid crystal display device according to the second embodiment.

These drawings are schematic views showing characteristics of the optical layer 65 and schematically show the intensity of light passing through the optical layer 65 when the light is incident on the optical layer 65. FIG. 14A corresponds to when the first incident light Li1 is incident. In the example, the first incident light Li1 is incident on the optical layer 65 along the Y-Z plane. The incident angle of the first incident light Li1 (the angle between the Z-axis direction and the first incident light Li1) is 30 degrees. FIG. 14A corresponds to the case where the light is incident from a direction parallel to the scattering central axis. FIG. 14B corresponds to when a third incident light Li3 is incident. In the example, the third incident light Li3 is incident on the optical layer 65 along the X-Z plane. The incident angle of the third incident light Li3 (the angle between the Z-axis direction and the third incident light Li3) is 30 degrees. FIG. 14B corresponds to the case where the light is incident from a direction perpendicular to the scattering central axis.

The concentric circles shown in these drawings correspond to angles (equiangular lines) having the Z-axis direction as the reference. The center of the concentric circles corresponds to the transmitted light (the perpendicularly-emitted light) being emitted from the optical layer 65 substantially along the Z-axis direction. Bright regions B1 and B2 that are shown in these drawings are regions where the intensity of the transmitted light is high.

As shown in FIG. 14A, the intensity of the perpendicularly-emitted light is high for the first incident light Li1 along the Y-axis direction. The intensity of the transmitted light emitted in the direction tilted in the Y-Z plane also is high.

As shown in FIG. 14B, the intensity of the perpendicularly-emitted light is low for the third incident light Li3 along the X-axis direction. The intensity of the transmitted light in the direction tilted in the X-Z plane (the direction tilted from the perpendicular direction) is high.

Thus, in the optical layer 65, the intensity of the light of the optical layer 65 for the light (the first incident light Li1) incident on the optical layer 65 from the first incident direction is different from the intensity of the light of the optical layer 65 for the light (the second incident light Li2, the third incident light Li3, etc.) incident on the optical layer 65 from the second incident direction.

In the liquid crystal display device 115, the scattering central axis of the optical layer 65 is disposed to be a direction aligned with the major viewing angle direction Dw1 of the viewer 80 when projected onto the X-Y plane.

The light-shielding part 27 extends in a direction that is aligned with the scattering center direction of the optical layer 65 when projected onto the X-Y plane. Thereby, the loss of the light due to the light-shielding part 27 is reduced; and the luminance of the reflected light can be increased further. In the liquid crystal display device, the decrease of the brightness of the display can be suppressed.

Figure 15:
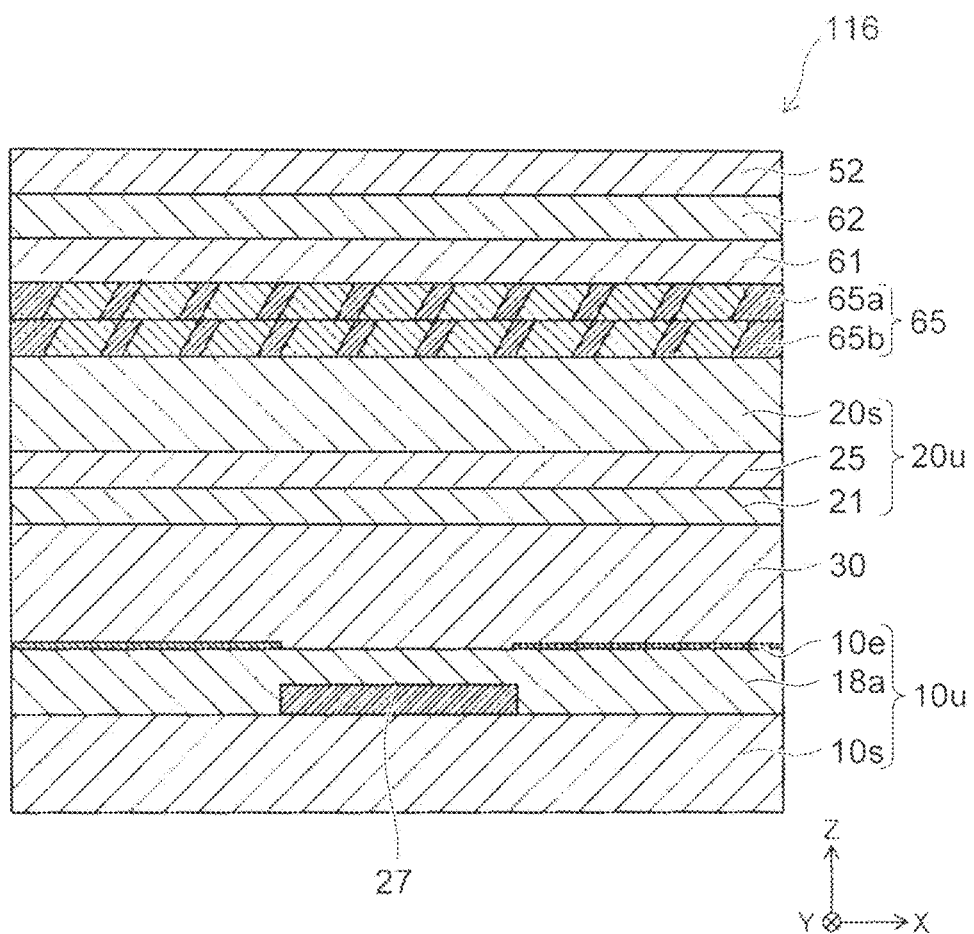
FIG. 15 is a schematic cross-sectional view showing the liquid crystal display device according to the second embodiment.

FIG. 15 is a schematic cross-sectional view showing the liquid crystal display device according to the second embodiment.

As shown in FIG. 15, the first substrate unit 10u, the second substrate unit 20u, and the liquid crystal layer 30 are provided in the liquid crystal display device 116 as well. In the example, the liquid crystal display device 116 includes the polarizing layer 52, the first phase difference layer 61, the second phase difference layer 62, and the optical layer 65. Configurations similar to the configuration described in regard to the liquid crystal display device 115 are applicable for these components.

The light-shielding part 27 and at least a portion of the inter-counter electrode region 14 overlap when projected onto the X-Y plane. The light-shielding part 27 and at least a portion of the inter-pixel region 15 overlap when projected onto the X-Y plane.

In the liquid crystal display device 116, a portion of the liquid crystal layer 30 is provided between the light-shielding part 27 and the second substrate unit 20u. Thus, the light-shielding part 27 may be provided on the first substrate unit 10u side.

Figure 16A:
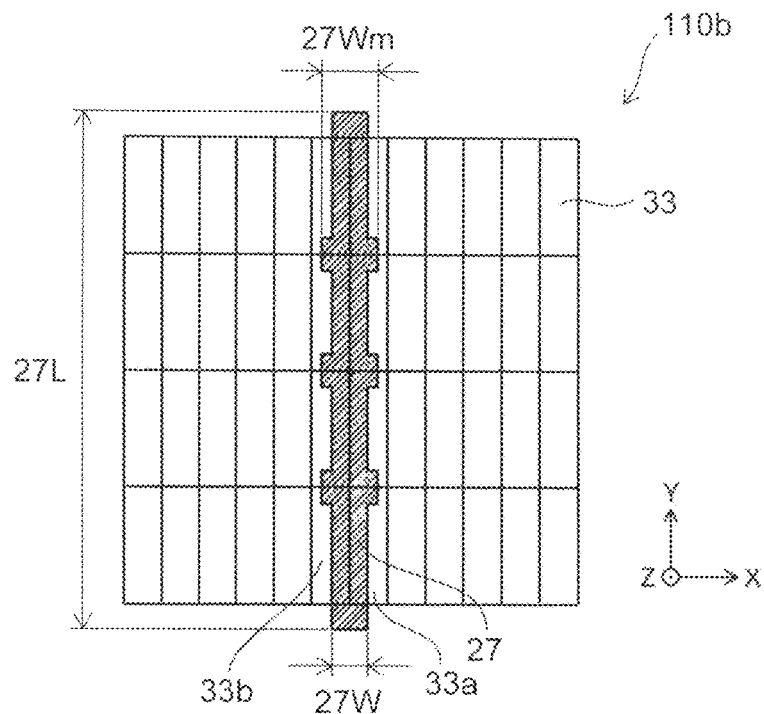
FIG. 16A and FIG. 16B are perspective plan views showing liquid crystal display devices according to the second embodiment.
Figure 16B:
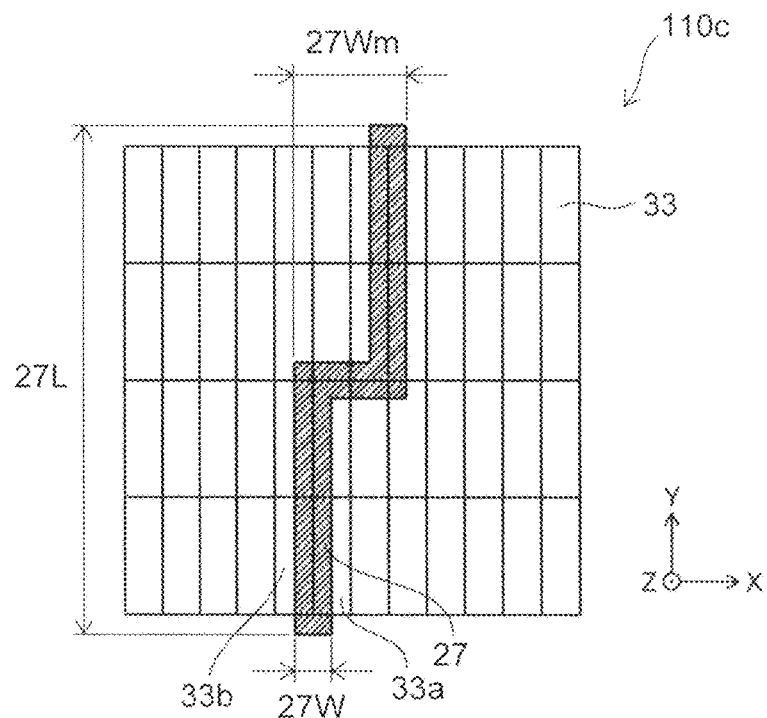

FIG. 16A and FIG. 16B are perspective plan views showing liquid crystal display devices according to the second embodiment.

FIG. 16A shows a liquid crystal display device 110b. FIG. 16B shows a liquid crystal display device 110c. Portions of the display device are not shown for easier viewing in these drawings. Configurations similar to the configuration described in regard to the liquid crystal display device 110 are applicable to the liquid crystal display device 110b and the liquid crystal display device 110c.

FIG. 16A shows a configuration of the light-shielding part 27 of the liquid crystal display device 110b when projected onto the X-Y plane.

FIG. 16B shows a configuration of the light-shielding part 27 of the liquid crystal display device 110c when projected onto the X-Y plane.

As shown in FIG. 16A and FIG. 16B, the length 27W of the light-shielding part 27 along the X-axis direction may be changed along the Y-axis direction.

The length of the light-shielding part 27 along the first direction has a maximum value (a maximum width 27Wm). The maximum width 27Wm is less than the length 27L of the light-shielding part 27 along the first direction. Thus, the planar configuration of the light-shielding part 27 extending in the Y-axis direction is not limited to a rectangle. Various modifications of the planar configuration of the light-shielding part 27 are possible.

According to the embodiments, a liquid crystal display device in which the decrease of the brightness is suppressed can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components such as the first substrate unit, the pixel electrode, the inter-pixel region, the second substrate unit, the counter electrode, the inter-counter electrode region, the light-shielding layer, the liquid crystal layer, the optical layer, the phase difference layer, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all liquid crystal display devices practicable by an appropriate design modification by one skilled in the art based on the liquid crystal display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal display device, comprising:
    a first substrate unit;
    a second substrate unit provided to oppose the first substrate unit; and
    a liquid crystal layer provided between the pair of substrate units,
    the first substrate unit including:
        a first major surface;

a plurality of pixel electrodes arranged in a matrix configuration in the first major surface, a row direction of the matrix being an X-axis direction, a column direction of the matrix being a Y-axis direction intersecting the X-axis direction; and an alignment film covering the pixel electrodes and opposing the liquid crystal layer, the pixel electrodes including a first pixel electrode and a second pixel electrode arranged to be adjacent along the row direction, a first inter-pixel region being provided to extend in the column direction between the first pixel electrode and the second pixel electrode, the second substrate unit including:

a second major surface opposing the first major surface of the first substrate unit;

a plurality of counter electrodes disposed in the second major surface, the counter electrodes being light-transmissive; and an alignment film covering the counter electrodes and opposing the liquid crystal layer, the counter electrodes including a first opposing portion and a second opposing portion, the first opposing portion and the second opposing portion opposing the pixel electrodes of the first substrate unit, the first opposing portion and the second opposing portion being provided to extend in the column direction, the first opposing portion and the second opposing portion being arranged to be adjacent to each other along the row direction, the first opposing portion opposing the first pixel electrode, and the second opposing portion opposing the second pixel electrode, an inter-counter electrode region being provided between the first opposing portion and the second opposing portion, a part of the inter-counter electrode region and the first inter-pixel region of the first substrate unit overlapping when projected onto the first major surface, a drive device being electrically connected to the pixel electrodes and being configured to drive the first pixel electrode and the second pixel electrode by mutually different polarities, the liquid crystal layer including:

a non-pixel portion provided between the first inter-pixel region and the second substrate unit; and a first region overlapping the first inter-pixel region and not overlapping the inter-counter electrode region, a light-shielding layer being provided in the second substrate unit, the light-shielding layer extending in the column direction and covering the inter-counter electrode region, the first inter-pixel region, the non-pixel region, and the first region the pixel electrode further including a third pixel electrode and a fourth pixel electrode, the first pixel electrode and the third pixel electrode being arranged to be adjacent to each other along the row direction, the second pixel electrode and the fourth pixel electrode being arranged to be adjacent to each other along the column direction, the drive device being configured to drive the third pixel electrode by the same polarity as the first electrode, a second inter-pixel region being provided to extend in the column direction between the first pixel electrode and the third pixel electrode, a third inter-pixel region being provided to extend in the row direction between the second pixel electrode and the fourth pixel electrode, the light-shielding layer not overlapping the second inter-pixel region and the third inter-pixel region, the first pixel electrode and the third pixel electrode belonging to a first pixel, the second pixel electrode belonging to a second pixel adjacent to the first pixel, each of the first pixel and the second pixel including a subpixel of a first color, a subpixel of a second color, and a subpixel of a third color, the first pixel electrode belonging to the subpixel of the first color of the first pixel, the second pixel electrode belonging to the subpixel of the second color of the second pixel, and the first inter pixel region and the inter-counter electrode region being covered by the light-shielding layer provided between the subpixel of the first color of the first pixel and the subpixel of the second color of the second pixel, the second color being different from the first color.

2. The device according to claim 1, wherein
an alignment direction of the alignment film on the first substrate unit side is orthogonal to one of the row direction or the column direction or intersects one of the row direction or the column direction at an acute angle, and
an alignment direction of the alignment film on the second substrate unit side intersects the one of the row direction or the column direction at an obtuse angle.

3. The device according to claim 1, wherein
the fourth pixel electrode is set to a potential having the same polarity as the first pixel electrode.

4. The device according to claim 1, further comprising an optical layer on the second substrate unit,
an intensity of scattered light of the optical layer for light incident on the optical layer from a first incident direction being different from an intensity of scattered light of the optical layer for light incident on the optical layer from a second incident direction, and
a direction component of the first incident direction in a plane parallel to the first major surface being different from a direction component of the second incident direction in the plane.

5. The device according to claim 4, wherein
the optical layer is formed in a sheet configuration and includes a plurality of first optical units and a second optical unit, the first optical units being light-transmissive and disposed in the plane, the second optical unit being light-transmissive and provided between two of the first optical units,
the first optical units and the second optical unit are provided from one surface of the optical layer to one other surface of the optical layer,
a refractive index of the second optical unit is different from a refractive index of each of the first optical units, and
a boundary between the second optical unit and the first optical units is tilted with respect to the plane.

6. The device according to claim 5, wherein
the optical layer has a scattering center direction having a straight line configuration from the one surface toward the one other surface, and
the intensity of the scattered light of the optical layer for the light incident on the optical layer from the first incident direction increases as an angle between the scattering center direction and the first incident direction decreases.

7. The device according to claim 6, wherein the scattering center direction when projected onto the first major surface is a direction aligned with the column direction.

8. The device according to claim 1, wherein
a polarizing layer is provided in the second substrate unit to cover the second major surface, and one or a plurality of phase difference layers is provided below the polarizing layer, and
a reflective layer is provided in each of the pixel electrodes of the first substrate unit, the reflective layer reflecting external light incident via the polarizing layer and the phase difference layer.

9. The device according to claim 1, wherein the light-shielding layer includes a compound including chrome.

* * * * *